United States Patent
Mathew et al.

(10) Patent No.: US 11,373,645 B1
(45) Date of Patent: Jun. 28, 2022

(54) UPDATING PERSONALIZED DATA ON A SPEECH INTERFACE DEVICE

(71) Applicant: Amazon Technologies, Inc., Seattle, WA (US)

(72) Inventors: Zach Mathew, Toronto (CA); Benjamin Charles Eagan, Toronto (CA); Fabian Andreas Bumberger, Toronto (CA); Alejandro Jose Ramirez Sanabria, Burlington (CA)

(73) Assignee: Amazon Technologies, Inc., Seattle, WA (US)

( * ) Notice: Subject to any disclaimer, the term of this patent is extended or adjusted under 35 U.S.C. 154(b) by 22 days.

(21) Appl. No.: 16/011,238

(22) Filed: Jun. 18, 2018

(51) Int. Cl.
| | |
|---|---|
| *G10L 15/22* | (2006.01) |
| *G10L 15/18* | (2013.01) |
| *G10L 15/30* | (2013.01) |
| *G10L 15/19* | (2013.01) |
| *G06F 40/295* | (2020.01) |

(52) U.S. Cl.
CPC .......... *G10L 15/22* (2013.01); *G06F 40/295* (2020.01); *G10L 15/1815* (2013.01); *G10L 15/19* (2013.01); *G10L 15/30* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 2002/0071577 A1* | 6/2002 | Lemay | H04N 5/44582 381/110 |
| 2010/0185445 A1* | 7/2010 | Comerford | G10L 15/06 704/251 |
| 2013/0151250 A1* | 6/2013 | VanBlon | G10L 15/32 704/235 |
| 2014/0207442 A1* | 7/2014 | Ganong, III | G10L 15/30 704/201 |
| 2015/0120288 A1* | 4/2015 | Thomson | G10L 15/22 704/231 |
| 2015/0154976 A1* | 6/2015 | Mutagi | H04L 12/281 704/275 |

(Continued)

FOREIGN PATENT DOCUMENTS

WO WO-2015041892 A1 * 3/2015 ............ G10L 15/22

*Primary Examiner* — Antim G Shah
(74) *Attorney, Agent, or Firm* — Lee & Hayes, P.C.

(57) ABSTRACT

A speech interface device is configured to update personalized data in local memory for responding to user speech. The speech interface device may receive compiled personalized data from a remote system, or raw personalized data from local devices in the environment of the speech interface device, the raw personalized data being compiled locally on the speech interface device. The compiled personalized data is received by an artifact manager of the speech interface device for storage in the memory of the speech interface device. A local speech processing component of the speech interface device may use the compiled personalized data when processing user speech in order to understand a spoken form of a word or phrase that is associated with a user. This allows for responding to personal user speech, even when the speech interface device is unable to communicate with a remote speech processing system over a wide area network.

21 Claims, 10 Drawing Sheets

(56) References Cited

U.S. PATENT DOCUMENTS

| | | | | |
|---|---|---|---|---|
| 2015/0279352 A1* | 10/2015 | Willett | ................ | G10L 19/0017 |
| | | | | 704/231 |
| 2016/0104486 A1* | 4/2016 | Penilla | .................... | G10L 17/06 |
| | | | | 704/232 |
| 2016/0379626 A1* | 12/2016 | Deisher | ................ | G10L 15/197 |
| | | | | 704/232 |
| 2018/0349093 A1* | 12/2018 | McCarty | ............... | H04L 12/282 |

* cited by examiner

UPDATING PERSONALIZED DATA ON A SPEECH INTERFACE DEVICE

BACKGROUND

Homes, offices and other spaces are increasingly equipped with Internet connectivity. The constant, or nearly constant, availability of network communications, in combination with increasing capabilities of computing devices—including hands-free, speech interface devices, like Amazon's Echo and other Alexa enabled devices—have created a number of new possibilities for services. For example, various cloud-based services (e.g., music streaming, smart home control, etc.) are accessible to users through convenient, hands-free interaction with their speech interface devices. Furthermore, cloud-based services offer personalization capabilities so that speech interface devices can understand, and respond to, unique words or phrases spoken by a particular user.

Provided herein are technical solutions to improve and enhance these and other systems.

BRIEF DESCRIPTION OF THE DRAWINGS

The detailed description is described with reference to the accompanying drawings. In the figures, the left-most digit(s) of a reference number identifies the figure in which the reference number first appears. The use of the same reference numbers in different figures indicates similar or identical components or features.

DETAILED DESCRIPTION

Figure 1:
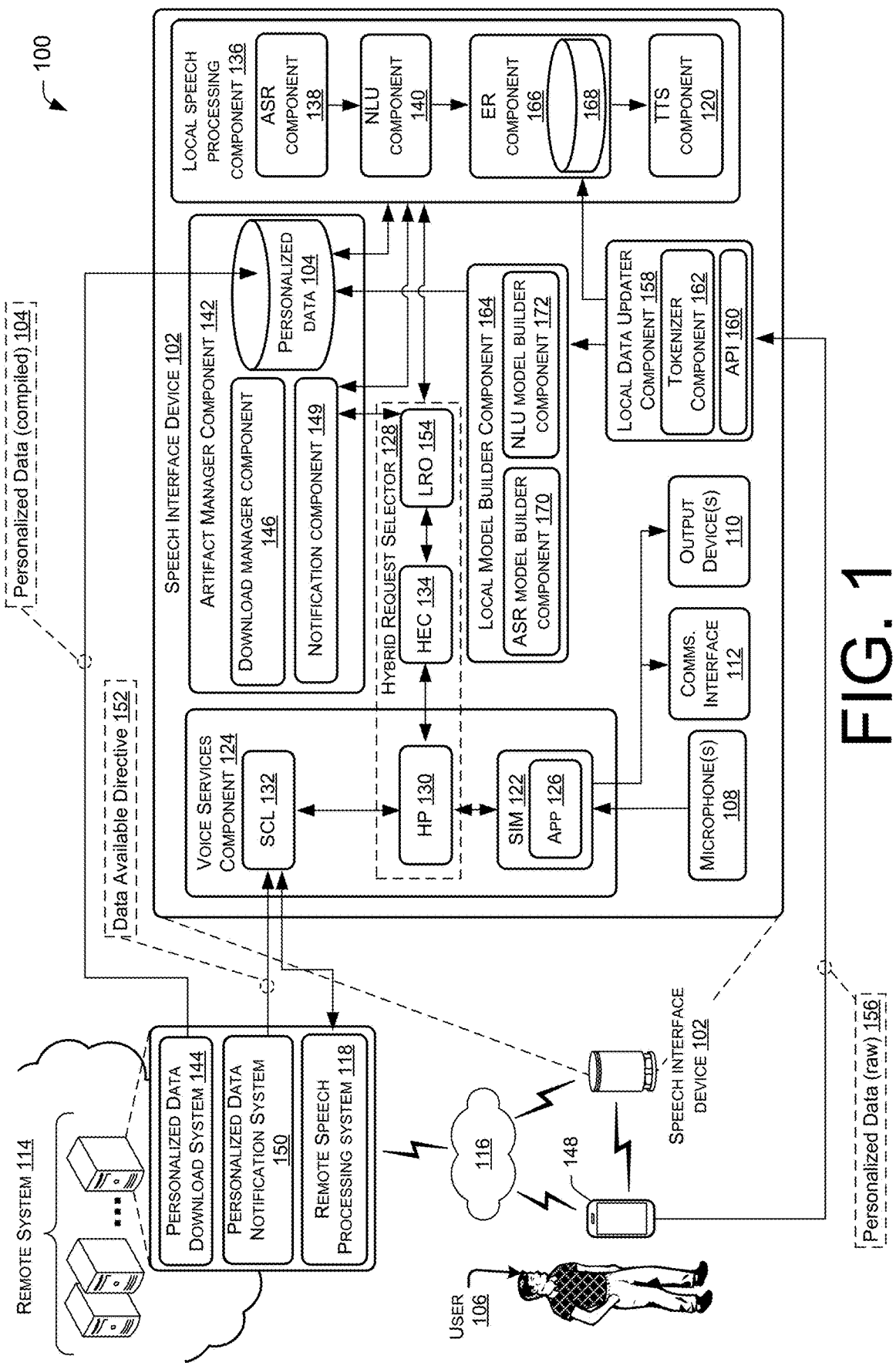
FIG. 1 is a block diagram illustrating a system including a speech interface device that is capable of updating personalized data on the speech interface device to enhance local speech processing on the speech interface device.

Described herein are, among other things, techniques, devices, and systems, including a speech interface device with an artifact manager component that allows for updating personalized data on the speech interface device. The personalized data maintained on the speech interface device is usable by a local speech processing component of the speech interface device in order to understand a spoken form of a word(s) or phrase(s) that is associated with a user account associated with the speech interface device. For example, the personalized data may relate to a name that the user created for a second device in the environment that is controllable using voice commands. In this example, the personalized data may be used by the local speech processing component to identify the second device as an entity when user speech includes the user-created name of the second device.

The speech interface device is also configured with "hybrid" functionality, which allows the speech interface device to process user speech locally, and to decide whether to respond to user speech using response data from a remote speech processing system, or response data from a local speech processing component. This hybrid functionality, allows the speech interface device to respond to user speech, even in instances when a remote system—which, when available, can be used for processing user speech remotely—is, for example, unavailable to, slower than (with network-related latency factored in), or otherwise less preferred than the speech interface device. Another example benefit of the hybrid functionality is to protect privacy of sensitive user information. For example, some user-device interactions may benefit from the speech processing being handled locally, such as when the user utters a password for unlocking a front door, or to control another smart home device.

In a "connected" condition, the speech interface device is able to establish a communications session with a remote system over a wide area network, which allows the artifact manager of the speech interface device to receive compiled personalized data from the remote system whenever the personalized data is to be updated on the speech interface device. Additionally, or alternatively, the speech interface device can receive, from other local devices in its environment, personalized data in raw form (e.g., text data, audio data, etc.), regardless of whether the remote system is available or unavailable to the speech interface device. The speech interface device can convert this "raw" personalized data into text data that represents the spoken form of a word(s) or phrase(s), and compile the text data to generate compiled personalized data. The artifact manager can then update the speech interface device with this compiled personalized data.

After storing compiled personalized data in local memory, the speech interface device can use the stored personalized data to respond to user speech in the future without receiving data, or by receiving less data, from the remote speech processing system. Not only does the locally-available personalized data allow the speech interface device to respond to user speech in instances when the Internet is down, and/or when a remote system cannot otherwise be reached, but it allows the speech interface device to do so with improved accuracy and/or enhanced functionality, as compared to an accuracy that is achievable without such personalized data being locally accessible. To illustrate, consider a case where a user named a controllable light in his/her house "Entity Name A." During a storm, when the Internet is down and the remote system is unavailable to the speech interface device, if a user utters the expression "Turn on Entity Name A," the local speech processing component can understand, based on the locally accessible personalized data, that this utterance is to be interpreted as a command to turn on a particular light in the environment. In other words, the local speech processing component can generate directive data as a result of processing audio data that represents a spoken form of the words "Entity Name A." Thus, the speech interface device may respond to the utterance "Turn on Entity Name A" based on locally-generated directive data by causing the speech interface device to send a "turn on" command to the correct light in the user's house, without relying on the remote system to process the user speech.

FIG. 1 is a block diagram illustrating a system 100 including a speech interface device 102 that is capable of updating personalized data 104 on the speech interface device 102. This updating of personalized data 104 allows for enhancing local speech processing (e.g., to recognize a word(s) or phrase(s) in user speech that is associated with a particular user) on the speech interface device 102. Local speech processing is enabled by the speech interface device's 102 "hybrid" capabilities, as will be described in more detail below.

The speech interface device 102 may be located within an environment to provide various capabilities to a user 106, when the user 106 is also in the environment. The environment in which the speech interface device 102 is located may be a home, office, hotel, or other premises, an automobile, or any similar environment. Such an environment may include other devices including additional speech interface devices, and/or second devices (e.g., mobile phones, tablets, televisions, Internet of Things (IoT) devices and/or home automation devices like thermostats, lights, refrigerators, ovens, etc.). Some second devices, like IoT devices and/or home automation devices, may be controllable (e.g., turned off/on, adjusted, etc.) by speech interface devices, such as the speech interface device 102. When acting as a hub, the speech interface device 102 may be configured to connect a plurality of devices in an environment and control communications among them, thereby serving as a place of convergence where data arrives from one or more devices, and from which data is sent to one or more devices. The speech interface device 102 can be an automobile, cell phone, or any other device.

In general, the speech interface device 102 may be capable of capturing utterances with a microphone(s) 108, and responding in various ways, such as by outputting content via an output device(s) 110, which may be a speaker(s), a display(s), or any other suitable output device 110. In addition, the speech interface device 102 may be configured to respond to user speech by controlling second devices that are collocated in the environment with the speech interface device 102, such as by sending a command to a second device via a communications interface 112 (e.g., a short range radio), the command instructing an operation to be performed at the second device (e.g., to turn on a light in the environment). In addition to using the microphone(s) 108 to capture utterances as audio data, the speech interface device 102 may additionally, or alternatively, receive audio data (e.g., via the communications interface 112) from another speech interface device in the environment, such as when the other speech interface device captures an utterance from the user 106 and sends the audio data to the speech interface device 102. This may occur in situations where the other speech interface device would like to leverage the "hybrid" capabilities of the speech interface device 102.

Under normal conditions, the speech interface device 102 may operate in conjunction with and/or under the control of a remote, network-based or network-accessible control system 114 (abbreviated to "remote system" 114 in FIG. 1 and elsewhere herein). The remote system 114 may, in some instances be part of a network-accessible computing platform that is maintained and accessible via a wide area network 116. Network-accessible computing platforms such as this may be referred to using terms such as "on-demand computing", "software as a service (SaaS)", "platform computing", "network-accessible platform", "cloud services", "data centers", and so forth. The remote system 114 may be configured to provide particular functionality to large numbers of local (e.g., in-home, in-car, etc.) devices of different users.

The wide area network 116 is representative of any type of public or private, wide-area network, such as the Internet, which extends beyond the environment of the speech interface device 102. Thus, the wide area network 116 may represent and/or include, without limitation, data and/or voice networks, a wired infrastructure (e.g., coaxial cable, fiber optic cable, etc.), a wireless infrastructure (e.g., radio frequencies (RF), cellular, satellite, etc.), and/or other connection technologies.

In some embodiments, the remote system 114 may be configured to receive audio data from the speech interface device 102, to recognize speech in the received audio data using a remote speech processing system 118, and to perform functions in response to the recognized speech. In some embodiments, these functions involve sending directives, from the remote system 114, to the speech interface device 102 to cause the speech interface device 102 to perform an action, such as output an audible response to the user speech via a speaker(s) (i.e., an output device(s) 110), and/or control second devices in the environment by sending a control command via the communications interface 112. Thus, under normal conditions, when the speech interface device 102 is able to communicate with the remote system 114 over a wide area network 116 (e.g., the Internet), some or all of the functions capable of being performed by the remote system 114 may be performed by sending directive data (sometimes referred to as "a directive(s)") over the wide area network 116 to the speech interface device 102, which, in turn, may process the directive data for performing an action(s). For example, the remote system 114 may send directive data to the speech interface device 102 instructing the speech interface device 102 to output an audible response (e.g., using a text-to-speech (TTS) component 120) to a user's question, to output content (e.g., music) via a speaker of the speech interface device 102, and/or to turn on a light in the environment. It is to be appreciated that the remote system 114 may be configured to provide other functions in addition to those discussed herein, such as, without limitation, providing step-by-step directions for navigating from an origin to a destination location, conducting an electronic commerce transaction on behalf of the user 106 as part of a shopping function, establishing a communication session between the user 106 and another user, and so on.

Whether an utterance from the user 106 is captured by the microphone(s) 108 of the speech interface device 102 or captured by a microphone(s) of another speech interface device in the environment and sent as audio data to the speech interface device 102, the audio data representing the user's 106 speech is ultimately received by a speech interaction manager (SIM) 122 of a voice services component 124 executing on the speech interface device 102. The SIM 122 may manage received audio data by processing utterances as events, and the SIM 122 may also manage the processing of directives that are used to respond to the user speech (e.g., by controlling the action(s) of the speech interface device 102). The SIM 122 may include one or more client applications 126 or skills for performing various functions at the speech interface device 102.

A hybrid request selector 128 (or, hybrid request selector component 128) of the speech interface device 102 is shown as including a hybrid proxy (HP) 130 (or, hybrid proxy (HP) subcomponent 130), among other subcomponents. The HP 130 can be implemented as a layer within the voice services component 124 that is located between the SIM 122 and a speech communication library (SCL) 132, and may be configured to proxy traffic to/from the remote system 114. For example, the HP 130 may be configured to pass messages between the SIM 122 and the SCL 132 (such as by passing events and directives there between), and to send messages to/from a hybrid execution controller (HEC) 134 (or, hybrid execution controller (HEC) subcomponent 134) of the hybrid request selector 128. For instance, directive data received from the remote system 114 can be sent to the HEC 134 using the HP 130, which sits in the path between the SCL 132 and the SIM 122. The HP 130 may also be configured to allow audio data received from the SIM 122 to pass through to the remote speech processing system 118 (via the SCL 132) while also receiving (e.g., intercepting) this audio data and sending the received audio data to the HEC 134 (sometimes via an additional SCL).

A local speech processing component 136 (sometimes referred to as a speech processing component 136 of the speech interface device 102) is configured to process audio data representing user speech. In order to process audio data representing user speech, the local speech processing component 136 may utilize "artifacts." An "artifact," as used herein, means compiled data that is executable by one or more subcomponents of a speech processing system, such as subcomponents of the local speech processing component 136, when responding to user speech. Examples of artifacts include, without limitation, ASR models (e.g., acoustic models, language models, etc.), NLU models (e.g., grammar models), ER data (e.g., lexical data, including association data that associates names of entities with canonical identifiers of those entities, etc.), and/or TTS voice files.

In some embodiments, artifacts can be "static" or "dynamic." A static artifact (e.g., a static ASR model, a static NLU model, etc.) does not include personalization, and, thus, is the same for different users of a user group. For example, different users associated with a common geographic location or area, and/or different users of a common device type or version of a speech interface device 102 may have the same static artifact(s) downloaded on their respective speech interface devices 102. Static artifacts may be infrequently updated as compared to a frequency at which dynamic artifacts are updated. A dynamic artifact (e.g., a dynamic ASR model, a dynamic NLU model, etc.) may vary across users of a user group. A personalized artifact is an example of a dynamic artifact because a personalized artifact (e.g., a personalized ASR model, a personalized NLU model, etc.) is generated for a particular user or user account, such as a user account of the user 106 shown in FIG. 1. Because a given user 106 is associated with one or more speech interface devices 102, a personalized artifact can also be considered to be generated for a particular speech interface device 102, or a set of speech interface devices, registered to a particular user account. Thus, a personalized artifact includes personalization and is different for each different user account, a user account corresponding to at least one user 106. The remote system 114 may maintain user accounts for users of speech interface devices, such as the user 106 of the speech interface device 102, and/or a speech interface device, such as the speech interface device 102, may maintain user account data locally with respect to user accounts to which the speech interface device is registered. Both static and dynamic (e.g., personalized) artifacts are usable by subcomponents of the local speech processing component 136 to process user speech. However, a personalized artifact allows subcomponents of the local speech processing component 136 to understand a spoken form of a word(s) or phrase(s) in user speech that is associated with a particular user account (and, hence, associated with a user 106 associated with the user account), whereas, a static artifact does not, by itself, allow for such recognition of personal words or phrases (e.g., words or phrases associated with a user account that are not recognizable, understandable, or the like, using a static artifact (e.g., a static ASR model, a static NLU model, etc.).

Accordingly, the personalized data 104 shown in FIG. 1 represents the aforementioned personalized artifacts, and is meant to include personalized data 104 in compiled form (hence the term "artifact") that is usable by one or more subcomponents of the local speech processing component 136 to understand a spoken form of word(s) or phrase(s) in user speech that is associated with the user account of the user 106. The personalized data 104 can be maintained in memory of the speech interface device 104 at a storage location that is accessible to the local speech processing component 136 for such purposes. In some embodiments, the compiled form of the personalized data 104 includes one or more personalized finite state transducers (FST) that are usable, by the local speech processing component 136, to process user speech that includes a personal word(s) or phrase(s). A FST may include a compressed graph structure that relates to words and/or phrases (e.g., names of entities, personal expressions of intent, etc.) that are unique to a particular user 106. For example, a personalized ASR model may be compiled in FST format for use with an automatic speech recognition (ASR) subcomponent 138 of the local speech processing component 136. Meanwhile, a personalized NLU model may be compiled in FST format for use with a natural language understanding (NLU) subcomponent 140 of the local speech processing component 136. In some embodiments, personalized ASR models and/or personalized NLU models may be specific to a particular domain.

The personalized data 104 can represent various types of data, and may originate from various sources. For example, the user 106 may be associated with a user device 148, such as a phone, a tablet, or a similar device, and this user device 148 may include contacts of people, businesses, etc., that the user 106 can call, or otherwise communicate with, over a network using the user device 148 as a communication device. The user device 148 may also have installed thereon a companion application that can be utilized for accessing various features and functionality with respect to the speech interface device 102. For example, a companion application may expose functionality (e.g., a user interface) for setting up or creating names for devices in the user's 106 premises, such as user-created names for various IoT or home automation devices (e.g., lights, door locks, thermostats, etc.). In some scenarios, the user 106 may, additionally or alternatively, subscribe to a content streaming service (e.g., a music streaming service) where the user 106 can create playlists and name the playlists. This, and other types of, personal data can be uploaded (from the user device 148 or from a third party system) to the remote system 114, processed into compiled personalized data 104 (e.g., personalized artifacts), and made available for download to the speech interface device 102. This, and other types of, personal data can also be sent directly from a local device, such as the user device 148, to the speech interface device 102, and processed into compiled personalized data 104 (e.g., personalized artifacts) on the speech interface device 102 itself.

Accordingly, an artifact manager 142 (or, artifact manager component 142) of the speech interface device 102 may be configured to maintain the personalized data 104 as compiled data at a storage location in the memory of the speech interface device 102 that is accessible to the local speech processing component 136, and to update the personalized data 104 (e.g., store new personalized data 104 in local memory) at various times, and in response to various events or criteria being met. In this way, the speech interface device 102 can maintain up-to-date personalized data 104 that is usable to process user speech containing words or phrases associated with the user 106, which may improve the accuracy of the output from the speech interface device 102 in response to user speech, especially in cases where the remote speech processing system 118 is unavailable to the speech interface device 102 for processing user speech. In other words, the artifact manager 142 is tasked with maintaining an offline cache of personalized data 104 on the speech interface device 102, and this offline cache of personalized data 104 can be updated with new, compiled personalized data 104 after the new data becomes available to ensure that up-to-date personalized data 104 is available for local speech processing, which is particularly useful in cases where the remote speech processing system 118 is unavailable to the speech interface device 102, or is slow to respond with directive data.

As mentioned, the artifact manager 142 may receive new personalized data 104 in various ways. One way of receiving new personalized data 104 is from the remote system 114. The remote system 114 is shown as including a personalized data download system 144, which is configured to make personalized data 104 in compiled form (e.g., personalized artifacts) accessible to the artifact manager component 142 of the speech interface device 102 to download. The artifact manager 142 may include a download manager 146 (or, download manager subcomponent 146) and a notification subcomponent 149. The download manager 146 is configured to create download tasks to receive personalized data 104 from the personalized data download system 144, and these download tasks can be created based on a "pull" scheme or a "push" scheme. In the "pull" scheme, the artifact manager 142 may send request data to the remote system 114 for requesting compiled personalized data. This request data may include an identifier of the user account associated with the user 106, and, hence, the speech interface device 102 that is registered with the user account. This request data may, additionally or alternatively, include a device identifier of the speech interface device 102, which is associated with the user account of the user 106. In either case, the identifier can be used by the remote system 114 to determine if any new, compiled personalized data 104 is available for the speech interface device 102 to download. For example, the user 106 may have recently created a name for a light in his/her kitchen that the user 106 would like to turn on/off using a voice command including the user-created name. The text data corresponding to this user-created name can be uploaded via a companion application installed on the user device 148 and processed by the remote system 114 to generate new, compiled personalized data 104 for download to the speech interface device 102. When such personalized data 104 is available for download, the personalized data download system 144 may send, and the artifact manager component 142 may receive, availability data indicating that the new, personalized data 104 is available. Based on this availability data, the download manager 146 can create a download task to receive the new personalized data 104. In some embodiments, the artifact manager 142 may send authentication data to the remote system 114 in order to authenticate with the remote system 114 and/or the personalized data download system 144 before new personalized data 104 is sent to the speech interface device 102.

In the "push" scheme, the remote system 114 may use a personalized data notification system 150 to send notifications to the speech interface device 102 whenever new personalized data 104 becomes available. These notifications can be sent as directive data via the voice services component 124 of the speech interface device 102. For example, a data available directive 152 (i.e., remote directive data) can be sent from the personalized data notification system 150 to the voice services component 124 of the speech interface device 102 to indicate that new personalized data 104 is available. This remote directive data (e.g., the data available directive 152) can be received by the SCL 132, which forwards the directive data to the HP 130, which forwards the directive data to the HEC 134, which forwards the directive data to a local request orchestrator (LRO) 154 (or, local request orchestrator (LRO) subcomponent) of the hybrid request selector 128, and the LRO 154 is configured to notify the notification subcomponent 149 of the artifact manager 142 that new personalized data 104 is available. Based on the notification subcomponent 149 receiving this notification about the availability of new personalized data 104, the download manager 146 may create a download task to receive the new personalized data 104. In some embodiments, whether a "pull" scheme or a "push" scheme is used to receive new personalized data 104, the creation of a download task may cause request data to be sent to the personalized data download system 144 of the remote system 114 requesting to receive new personalized data 104. Again, the artifact manager 142 may send authentication data to the remote system 114 in order to authenticate with the remote system 114 and/or the personalized data download system 144 before new personalized data 104 is sent to the speech interface device 102. In some embodiments, the LRO 154 may notify the artifact manager 142 of the availability of updated authentication data, such as a token or a key, which is received from the remote system 114 and is usable to download personalized data from the personalized data download system 144 of the remote system 114.

Another way of receiving new personalized data is from a device that is collocated in an environment with the speech interface device 102, such as the user device 148. In this scenario, instead of receiving new personalized data 104 in compiled form (which is the case when new personalized data 104 is received from the remote system 114), the speech interface device 102 receives "raw" personalized data 156 from other local devices that is not in compiled form. This raw personalized data 156 may be in the form of text data, audio data, or the like, which represents a word(s) or phrase(s) that is associated with a user account of the user 106. For example, text data of contacts, entity names entered via a companion application, content (e.g., music) playlists, etc., may be sent as text data from the user device 148 to a local data updater 158 (or, local data updater component 158) of the speech interface device 102. An application programming interface (API) 160 of the local data updater component 158 may allow the local data updater component 158 to communicate with, and receive raw personalized data 156 from, local devices in the environment, such as via wireless transmission, wired transmission, and the like. Once new, raw personalized data 156 is received via the API 160 of the local data updater component 158, a tokenizer 162 (or, tokenizer subcomponent 162) of the local data updater component 158 may convert the raw personalized data 156 (e.g., input text data, input audio data, etc.) into output text data that represents a spoken form of a word(s) or phrase(s) in the raw personalized data 156. For example, the tokenizer 162 may convert the input text data "Dr. Adams" (which may be a contact in the user device 148) into the output text data "Doctor Adams," which is the spoken form of the input text data "Dr. Adams."

The output text data from the tokenizer 162 may be sent to a local model builder 164 (or, local model builder component 164) of the speech interface device 102 to generate personalized data 104 in compiled form. The output text data from the tokenizer 162 may also, or alternatively, be sent to an entity resolution (ER) subcomponent 166 of the local speech processing component 136 for storage within association data 168 maintained by the ER subcomponent 166. The association data 168 may associate the output text data with identifiers (e.g., canonical identifiers) of entities so that a name of an entity spoken by a user can be resolved into an identifier of an entity for purposes of identifying an entity within the user speech.

With regard to the subcomponents of the local speech processing component 136, FIG. 1 shows arrows connecting the subcomponents, such as the arrow from the ASR subcomponent 138 to the NLU subcomponent 140, the arrow from the NLU subcomponent 140 to the ER component 166, and the arrow from the ER component 166 to the TTS component 120. This is to indicate an example flow of data processing from one subcomponent to the next, and is not meant to limit the ways in which the subcomponents can interface each other and/or with external components. In some embodiments, the LRO 154 may be configured to manage the transfer of data to, from, and/or between any individual subcomponents, or sets of subcomponents, within the local speech processing component 136 to enable any suitable transfer of data between the subcomponents.

The local model builder 164 may include an automatic speech recognition (ASR) model builder 170 (or, automatic speech recognition (ASR) model builder subcomponent 170) for generating compiled personalized data 104 in the form of a personalized ASR model based on the output text data received from the local data updater component 158. The local model builder 164 may further include a natural language understanding (NLU) model builder 172 (or, natural language understanding (NLU) model builder subcomponent 172) for generating compiled personalized data 104 in the form of a personalized NLU model based on the output text data received from the local data updater component 158. In general, the local model builder component 164 is configured to compile the output text data received from the local data updater component 158 to generate personalized data 104 in compiled form, which can be sent to the artifact manager 142 for storage in memory of the speech interface device 102 at a storage location that is accessible to the local speech processing component 136.

After successful storage of new personalized data 104, the notification subcomponent 149 of the artifact manager 142 may send notification data to the local speech processing component 136 (and/or subcomponents thereof) indicating an availability of the newly stored personalized data 104. The notification data sent to the local speech processing component 136 may specify the storage location in local memory from which the personalized data 104 can be accessed.

Accordingly, when the user 106 utters an expression that includes a word(s) or phrase(s) that is associated with the user account of the user 106, the SIM 122 may receive audio data corresponding to this user speech (either via the microphone 108, or from another speech interface device in the environment that captured the utterance), and the HP 130 may allow the audio data to pass through to the remote speech processing system 118 via the SCL 132 and may also input the audio data to the local speech processing component 136 by routing the audio data through the HEC 134 of the hybrid request selector 128. At this point, the hybrid request selector 128 may wait for response data from either or both of the remote system 114 or the local speech processing component 1365.

The local speech processing component 136 is configured to receive the audio data from the hybrid request selector 128 (e.g., via the HEC 134) as input, to recognize speech in the audio data, to determine user intent from the recognized speech, and to determine how to act on the user intent by generating directive data. In this example, which involves user speech that includes a word(s) or phrase(s) that is associated with a user account of the user 106, the local speech processing component 136 is configured to use the personalized data 104 to understand a spoken form of the word(s) or phrase(s). In some cases, a directive may include a description of the intent (e.g., an intent to turn off {device A}). In some cases, a directive may include (e.g., encode) an identifier of a second device, such as a light, and an operation to be performed at the second device.

In some embodiments, the speech interface device 102 may be configured to compare the audio data to stored models used to detect a wakeword that indicates to the speech interface device 102 that the audio data is to be processed for determining an intent. In some embodiments, the hybrid request selector 128 may send the audio data to the local speech processing component 136 to have the local speech processing component 136 determine whether a wakeword is detected in the audio data, and, if a wakeword is detected, this indication may be provided to the hybrid request selector 128 so that the hybrid request selector 128 can proceed with routing the audio data to the remote speech processing system 118 while the local speech processing component 136 continues processing the audio data in parallel. If the local speech processing component 136 does not detect a wakeword in the audio data, this indication may be provided to the hybrid request selector 128 so that the hybrid request selector 128 can refrain from sending the audio data to the remote speech processing system 118, and the local speech processing component 136 may halt further operations after determining that the audio data does not include the wakeword. The audio data can be discarded in this situation.

As mentioned, the local speech processing component 136 may include the ASR subcomponent 138 that is configured to perform ASR processing on the audio data to convert the audio data into ASR text data. ASR transcribes audio data into text data representing the words of the user speech contained in the audio data. A spoken utterance in the audio data can be input to the ASR subcomponent 138, which then interprets the utterance based on the similarity between the utterance and pre-established language models available to the local speech processing component 136. When the personalized data 104 includes a personalized ASR model (e.g., a personalized language model used by the ASR subcomponent 138) that is customized to the user 106 (or multiple users) who created a user account to which the speech interface device 102 is registered, the ASR subcomponent 138 may utilize this personalized ASR model to compare the input audio data with sounds (e.g., subword units or phonemes) and sequences of sounds to identify a word(s) that match the sequence of sounds spoken in the utterance of the audio data. For instance, the personalized ASR models (e.g., language models and other data) in the personalized data 104 can be used by the ASR subcomponent 138 to generate ASR text data. In some embodiments, the ASR subcomponent 138 outputs the most likely text recognized in the audio data, or multiple hypotheses in the form of a lattice or an N-best list with individual hypotheses corresponding to confidence scores or other scores (such as probability scores, etc.).

As mentioned, the local speech processing component 136 may also include a NLU subcomponent 140 that performs NLU processing on the generated ASR text data to determine intent data and/or slot data so that directives may be determined based on the intent data and/or the slot data. Generally, the NLU subcomponent 140 takes textual input (such as processed from the ASR subcomponent 138) and attempts to make a semantic interpretation of the ASR text data. That is, the NLU component 140 determines the meaning behind the ASR text data based on the individual words, and then the NLU component 140 can implement that meaning. The NLU component 140 interprets a text string to derive an intent or a desired action or operation from the user 106. This may include deriving pertinent pieces of information in the text that allow the NLU component 140 to identify a second device in the environment, if the user, for example, intends to control a second device (e.g., a light in the user's 106 house). When the user 106 has created a name for such an entity that is associated with the user 106, the NLU component 140 can use a personalized NLU model in the personalized data 104 to understand the spoken form of this user-created name. The user 106 may also define a personal word(s) or phrase(s) for an intent (e.g., a play music intent). In an example, the user 106 may setup the speech interface device 102 to recognize the phrase "Give me some" as a "play music intent." Thus, the personalized data 104 can be used by the NLU subcomponent 140 to recognize the expression "Give me some Guns N' Roses" as a "play music" intent as a, with the entity identified as an artist name of "Guns N' Roses." The local speech processing component 136 may also provide a dialog management function to engage in speech dialogue with the user 106 to determine (e.g., clarify) user intents by asking the user 106 for information using speech prompts.

The local speech processing component 136 may include, or be configured to use, one or more installed speechlets, which may represent domains that are used in order to determine how to act on an utterance in a particular way, such as by outputting a directive that corresponds to the determined intent, and which can be processed to implement the desired operation. Accordingly, the term "speechlet" may be used interchangeably with the term "domain" or "domain implementation." The speechlets installed on the speech interface device 102 may include, without limitation, a music speechlet (or music domain) to act an utterances with intents to play music on a device, such as via a speaker(s) of the speech interface device 102, a navigation speechlet (or a navigation domain) to act on utterances with intents to get directions to a point of interest with a known address, a shopping speechlet (or shopping domain) to act on utterances with intents to buy an item from an electronic marketplace, and/or a device control speechlet (or device control domain) to act on utterances with intents to control a second device(s) in the environment.

As mentioned, the local speech processing component 136 may include an ER subcomponent 166 that maintains association data 168 associating text data of named entities with identifiers (e.g., canonical identifiers) of those entities. In some embodiments, the ER subcomponent 166 may be utilized by the NLU subcomponent 140 in order to generate a particular interpreted response. For instance, grammar models and lexical data (including personalized grammar models and personalized lexical data within the personalized data 104) associated with the respective domains or speechlets can be applied in order to recognize one or more entities in the text of the query. In this manner the NLU component 140 may identify "slots" (i.e., particular words in query text) that may be needed for later command processing. Depending on the complexity of the NLU component 140, it may also use the ER subcomponent 166 to label each slot with a type of varying levels of specificity (such as noun, place, city, artist name, song name, device name, or the like). Each grammar model used by the NLU subcomponent 140 and/or the ER subcomponent 166 may include the names of entities (i.e., nouns) commonly found in speech about the particular domain (i.e., generic terms) and/or the names of entities that are associated with the user 106. Lexical information (e.g., from a gazetteer) that is personalized to the user(s) 106 and/or the device 102 can also be included in the personalized data 104. For instance, a personalized grammar model in the personalized data 104 can be associated with the navigation domain and may include one or more words or phrases used by the user when speaking a navigation-related voice command (e.g., "take me to my pad", which may be interpreted as a "navigate intent" with the user's home address identified as the destination).

The intents identified by the NLU subcomponent 140 may be linked to domain-specific grammar frameworks with "slots" or "fields" to be filled (e.g., resolved). Each slot/field corresponds to a portion of the query text that the system believes corresponds to a named entity. For example, if "play music" is an identified intent, a grammar framework(s) may correspond to sentence structures such as "Play {Artist Name}," "Play {Album Name}," "Play {Song name}," "Play {Song name} by {Artist Name}," etc. However, to make slot resolution more flexible, these frameworks would ordinarily not be structured as sentences, but rather based on associating slots with grammatical tags.

For example, the NLU subcomponent 140 may parse the query to identify words as subject, object, verb, preposition, etc., based on grammar rules and/or models (including personalized models within the personalized data 104), prior to recognizing named entities. The identified verb may be used by the NLU subcomponent 140 to identify an intent, which is then used to identify frameworks. A framework for an intent of "play" may specify a list of slots/fields applicable to play the identified "object" and any object modifier (e.g., a prepositional phrase), such as {Artist Name}, {Album Name}, {Song name}, etc. The NLU subcomponent 140 may then search the corresponding fields in the domain-specific and personalized lexicon(s) (e.g., within the personalized data 104), attempting to match words and phrases in the query tagged as a grammatical object or object modifier with those identified in the database(s).

After determining local intent data, or failing to do so, the local speech processing component 136 may send response data to the hybrid request selector 128, such as a "ReadyToExecute" response, which indicates that the local speech processing component 136 has recognized an intent, or is ready to communicate failure (if the local speech processing component 136 could not recognize an intent via the NLU subcomponent 140). The hybrid request selector 128 may then determine whether to use directive data from the local speech processing component 136 to respond to the user speech, or whether to use directive data received from the remote system 114, assuming a remote response is even received (e.g., when the speech interface device 102 is able to access the remote speech processing system 118 over the wide area network 116).

In some embodiments, the voice services component 124 may be configured to output static responses that are also cached in local memory of the speech interfaced device 102. These static responses may include, without limitation, recordings of short songs (e.g., a recording of the Happy Birthday Song sung by a voice assistant personality), or a canned response to a user's question, as spoken by the voice assistant personality. Thus, instead of generating directive data locally for purposes of responding to user speech, the voice services component 124 may be configured to retrieve static responses. In this scenario, the SIM 122 may not process directive data, as it typically does, to cause an action to be performed by the speech interface device 102. In other cases, locally-generated directive data can be output by the local speech processing component 136 and processed by the SIM 122 to cause an action to be performed by the speech interface device 102.

In some embodiments, the hybrid request selector 128 may control the execution of the local speech processing component 136, such as by sending "execute" and "terminate" events/instructions to the local speech processing component 136. An "execute" event may instruct the local speech processing component 136 to continue any suspended execution based on audio data (e.g., by instructing the local speech processing component 136 to execute on a previously-determined intent in order to generate a directive). Meanwhile, a "terminate" event may instruct the local speech processing component 136 to terminate further execution based on the audio data, such as when the speech interface device 102 receives directive data from the remote system 114 and chooses to use that remotely-generated directive data.

Figure 2:
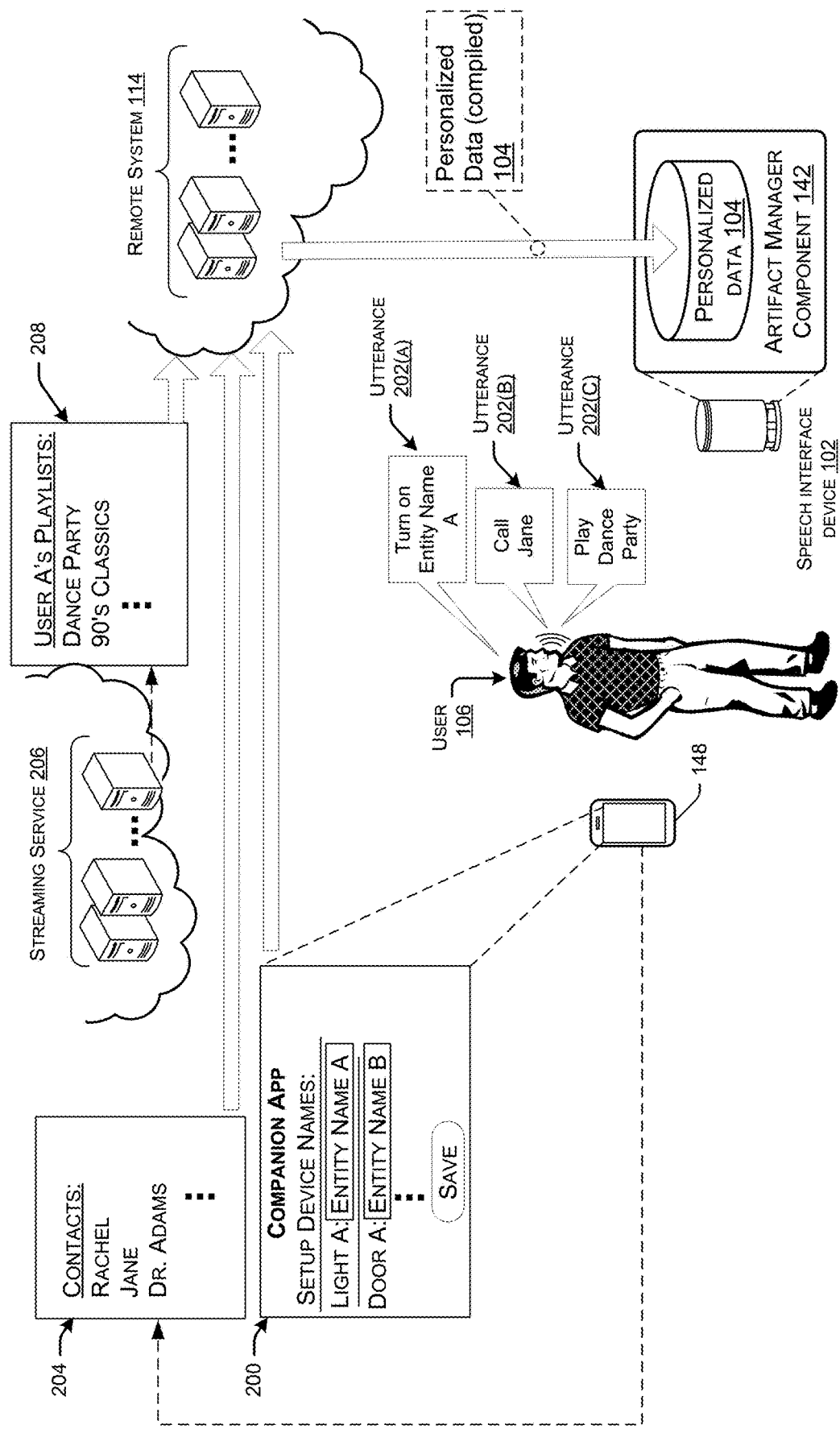
FIG. 2 is a schematic diagram showing example personalized data that is received from a remote system in compiled form and stored on a speech interface device for later use during local speech processing.

FIG. 2 is a schematic diagram showing example personalized data 104 that is received from a remote system 114 in compiled form and stored on a speech interface device 102 for later use during local speech processing. As shown in FIG. 2, a companion application 200 may be installed on a user device 148 of the user 106. The user 106 may use the companion application 200 to setup or create names for devices, such as lights, door locks, thermostats, etc., which the user 106 may want to control using voice commands detectable by the speech interface device 102. The user 106 may save these settings, and the companion application 200 may upload text data to the remote system 114, the text data relating to the names created by the user 106. In the example, the user 106 created the name "Entity Name A" for a light ("Light A") in the environment where the speech interface device 102 is located. The user 106 also created the name "Entity Name B" for a door (or a door lock) in the environment, which may be controllable (e.g., to lock/unlock the door). The remote system 114 may receive the text data uploaded from the user device 148, may process the text data to generate personalized data 104 in compiled form (e.g., personalized artifacts, such as ASR models, NLU models, etc.), and this personalized data 104 may be received by the artifact manager component 142 and stored in memory of the speech interface device 102 at a storage location accessible to the local speech processing component 136. Thereafter, the user 106 may speak the utterance 202(A) using the expression "Turn on Entity Name A," and the local speech processing component 136 may utilize the personalized data 104 to process this user speech so that it understands that the spoken form of the words "Entity Name A" are to be interpreted as an entity corresponding to "Light A."

As another example, the user device 148 may store a list of contacts 204 associated with phone numbers that can be used to call, or otherwise communicate with, those contacts 204 using the user device 148 (e.g., a mobile phone). If the user 106 wants to be able to communicate with his/her contacts 204 using the speech interface device 102, text data representing the contacts 204 can be uploaded to the remote system 114, as shown in FIG. 2, and the remote system 114 can process the text data to generate personalized data 104 in compiled form (e.g., personalized artifacts, such as ASR models, NLU models, etc.), and this personalized data 104 may be received by the artifact manager component 142 and stored in memory of the speech interface device 102 at a storage location accessible to the local speech processing component 136. Thereafter, the user 106 may speak the utterance 202(B) using the expression "Call Jane," and the local speech processing component 136 may utilize the personalized data 104 to process this user speech so that it understands that the spoken form of the word "Jane" is to be interpreted as an entity corresponding to the telephone number of Jane in the list of contacts 204.

As another example, the user 106 may subscribe to a streaming service 206 that allows the user 106 to stream content (e.g., music, videos, etc.) via playback devices of the user 106, including the speech interface device 102. As shown in FIG. 2, the streaming service 206 may allow the user to create playlists 208, and to give the playlists 208 user-created names, such as "Dance Party" and "90's Classics." The user 106 might compile a personalized playlist 208 of songs for any of these named playlists. If the user 106 wants to be able interact with the speech interface device 102 to play one of these playlists, text data representing the playlists 208 can be uploaded to the remote system 114 from the streaming service 206, as shown in FIG. 2, and the remote system 114 can process the text data to generate personalized data 104 in compiled form (e.g., personalized artifacts, such as ASR models, NLU models, etc.), and this personalized data 104 may be received by the artifact manager component 142 and stored in memory of the speech interface device 102 at a storage location accessible to the local speech processing component 136. Thereafter, the user 106 may speak the utterance 202(C) using the expression "Play Dance Party," and the local speech processing component 136 may utilize the personalized data 104 to process this user speech so that it understands that the spoken form of the words "Dance Party" are to be interpreted as an entity corresponding to the playlist 208 named "Dance Party" in the playlists 208 associated with the streaming service 206. In some embodiments, songs associated with these playlists 208 can be downloaded at a previous point in time in order to play music from a local source when the Internet is down.

Figure 3:
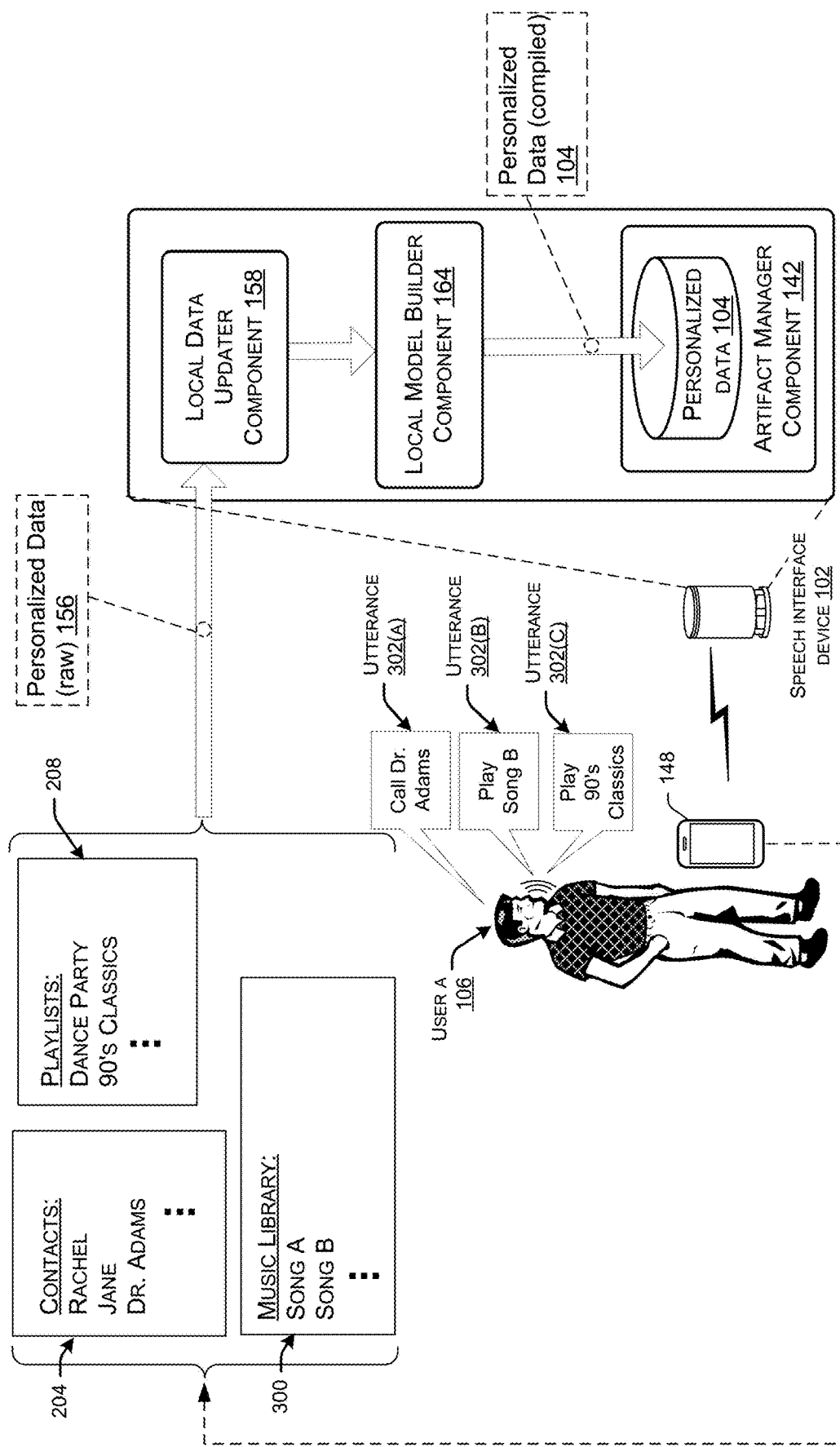
FIG. 3 is a schematic diagram showing example personalized data that is received directly from a local device collocated in an environment with the speech interface device. The personalized data is received in raw form, converted into compiled personalized data on the speech interface device, and stored on the speech interface device for later use during local speech processing.

FIG. 3 is a schematic diagram showing example personalized data 156 that is received directly from a local user device 148 collocated in an environment with the speech interface device 102. The personalized data 156 is received in raw form, converted into compiled personalized data 104 on the speech interface device 102, and stored on the speech interface device 102 for later use during local speech processing. An example use case of FIG. 3 is when the speech interface device 102 is part of an automobile head unit, and the user 106 pairs a phone (e.g., the user device 148) with the automobile head unit (e.g., using Bluetooth), and personalized data 156, such as contacts, music, etc., can be provided to the speech interface device 102. As shown in FIG. 3, personalized data 156 of various types may be provided by a local device, such as the user device 148, to the speech interface device 102 without reliance on the remote system 114. For instance, a music library 300, a list of contacts 204, and/or playlists 208 may be maintained on the device 148. If the user 106 wants to call his/her contacts stored on the local user device 148, and/or play songs from a music library 300 or a playlist 208 stored on the local user device 148, using voice commands detectable by the speech interface device 102, text data representing such information can be sent as raw personalized data 156 to the speech interface device 102. The local data updater component 158 may receive the raw personalized data 156 (e.g., input text data), convert the raw personalized data 156 into output text data that represents the spoken form of words or phrases associated with the user account of the user (e.g., by converting "Dr. Adams" to "Doctor Adams", converting "90's Classics" to "Nineties Classics", etc.), and send the output text data to the local model builder component 164, among other components. The local model builder component 164 may compile the output text data received from the local data updater component 158 to generate personalized data 104 in compiled form (e.g., personalized artifacts, such as a personalized ASR model, a personalized NLU model, etc.). The personalized data 104, now compiled, may be stored in memory of the speech interface device 102 using the artifact manager component 142. Thereafter, the personalized data 104 is available for local speech processing. In the example of FIG. 3, the user 106 is shown as speaking the utterance 302(A) using the expression "Call Dr. Adams," and the local speech processing component 136 may utilize the personalized data 104 to process this user speech so that it understands that the spoken form of the words "Doctor Adams" are to be interpreted as an entity corresponding to a contact 204 corresponding to Dr. Adams. The user 106 can also speak the utterance 302(B) using the expression "Play Song B," and the local speech processing component 136 may utilize the personalized data 104 to process this user speech so that it understands the spoken form of the words "Song B" are to be interpreted as an entity corresponding to a song available from a local music library 300 that can be streamed directly from the user device 148 and output via the speech interface device 102. The user 106 can also speak the utterance 302(C) using the expression "Play 90's Classics," and the local speech processing component 136 may utilize the personalized data 104 to process this user speech so that it understands the spoken form of the words "Nineties Classics" are to be interpreted as an entity corresponding to a playlist 208 including songs available from a local music library 300 that can be streamed directly from the user device 148 and output via the speech interface device 102.

The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 4:
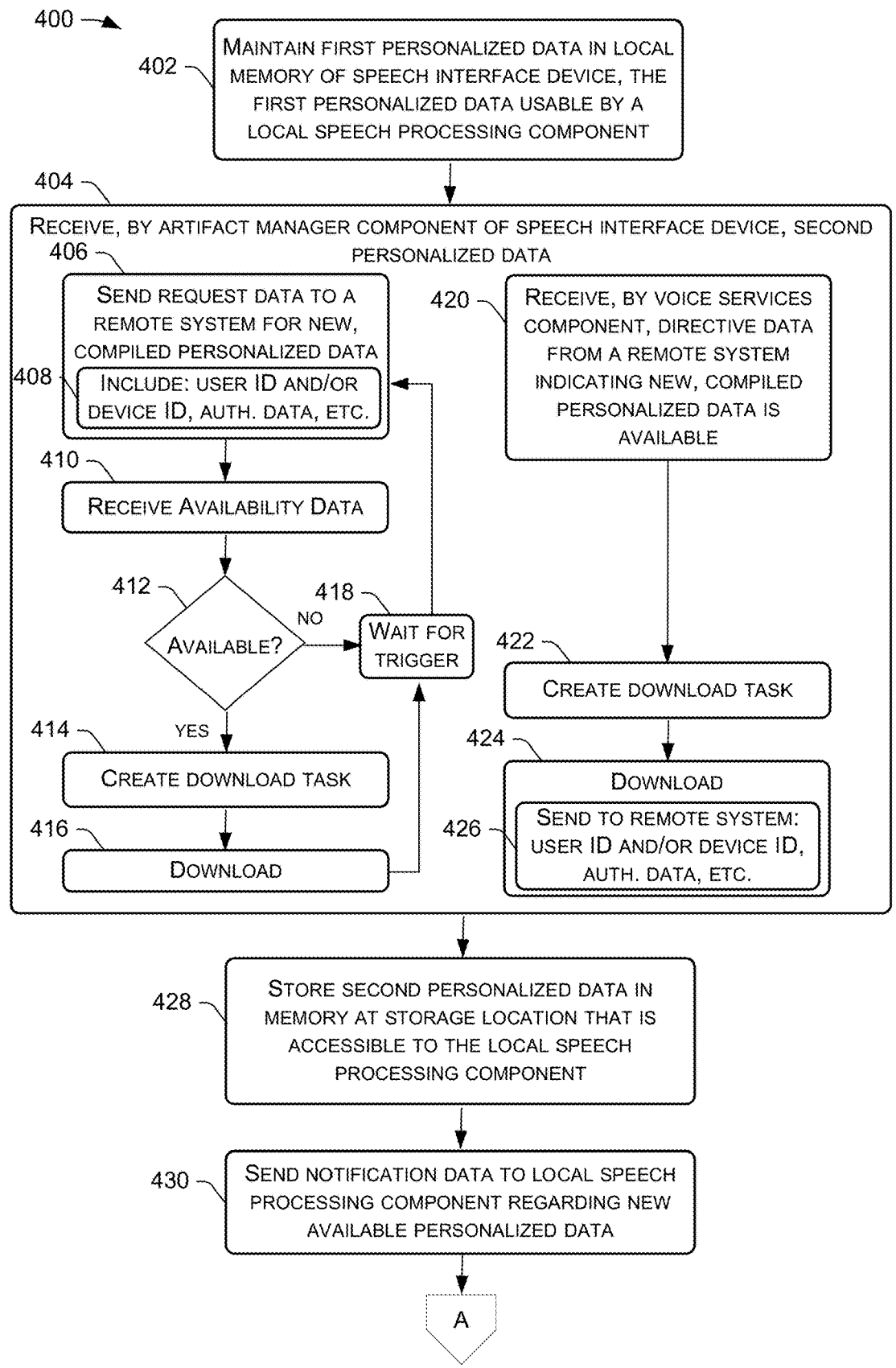
FIG. 4 is a flow diagram of an example process for updating personalized data on a speech interface device when the personalized data is received from a remote system in compiled form.

FIG. 4 is a flow diagram of an example process 400 for updating personalized data 104 on a speech interface device 102 when the personalized data is received from a remote system 114 in compiled form. For discussion purposes, the process 400 is described with reference to the previous figures.

At 402, an artifact manager 142 of a speech interface device 102 may maintain, in memory of the speech interface device 102, first personalized data 104 that is usable by a speech processing component 136 of the speech interface device 102 to understand a spoken form of a first word or phrase in user speech that is associated with a user account associated with the speech interface device 102. In other words, the local speech processing component 136 can use the first personalized data 104 to generate first directive data as a result of processing first audio data that represents the spoken form of the first word or phrase in the user speech that is associated with the user account. The first personalized data 104 may be maintained in compiled form and may represent one or more personalized artifacts (e.g., a personalized ASR model, a personalized NLU model, personalized lexical data, etc.) associated with a user account of a user 106 of the speech interface device 102. The first word or phrase may be associated with the user account by virtue of having been received by the remote system 114 as input text data from a device associated with the user 106, such as from the user device 148. In some embodiments, the first personalized data 104 includes one or more personalized FSTs (e.g., an ASR FST, a NLU FST, etc.) that are usable, by the local speech processing component 136, to process user speech that includes a personal word(s) or phrase(s). The storage location in the memory where the first personalized data 104 is maintained may correspond to a file system of the speech interface device 102.

At 404, the artifact manager 142 of the speech interface device 102 may receive second personalized data 104 that is not currently stored in the memory of the speech interface device 102. The second personalized data 104 received at block 404 is compiled data that is usable by the local speech processing component 136 to understand a spoken form of the first word or phrase (included in the first personalized data 104) and a spoken form of a second word or phrase that is associated with the user account (not included in the first personalized data). Thus, the second personalized data 104 represents updated personalized data 104 that can be used to understand one or more words or phrases that may not be understandable to the local speech processing component 136 if it were to rely on the first personalized data 104 to process user speech that includes the second word or phrase. The second word or phrase may be associated with the user account by virtue of having been received by the remote system 114 as input text data from a device associated with the user 106, such as from the user device 148.

As shown by the sub-blocks of block 404, the receiving of the second personalized data 104 at block 404 may include the artifact manager 142 sending, at block 406, request data to a remote system 114 for requesting compiled personalized data. As shown by sub-block 408, the artifact manager 142 may include, in the request data, an identifier of the user account (user ID), a device identifier (device ID) of the speech interface device 102, and/or authentication data. The user ID and/or device ID may be used to identify the user account so that personalized data 104 corresponding to that user account can be identified. The authentication data can include a token or a key used for authenticating the user account and/or the speech interface device 102 before receiving any new personalized data 104. In some embodiments, the artifact manager 142 may receive authentication data from the remote system 114 at some earlier point in time (e.g., the remote system 114 may periodically issue new authentication data for improved security) such that the authentication data can be used to request new compiled personalized data. The LRO 154 can notify the artifact manager 142 via the notification subcomponent 149 whenever new authentication data is available.

At sub-block 410, the artifact manager 142 may receive availability data from the remote system 114 indicating whether the second personalized data 104 is available or unavailable. At 412, a determination may be made as to whether the availability data indicates that the second personalized data 104 is available. If the second personalized data 104 is available (as indicated by the availability data), the process 400 may follow the "YES" route from sub-block 412 to sub-block 414 where the download manager 146 of the artifact manager 142 may create a download task to receive the second personalized data 104, and, at sub-block 416, the second personalized data 104 may be downloaded based at least in part on the download task created at sub-block 414. The downloading of the second personalized data 104, as described herein, can be resilient to network disruptions, such as a temporary network outage, so that the download of the second personalized data 104 does not fail completely if a network disruption occurs (e.g., the download manager 146 may be configured to resume an interrupted download task that did not complete prior to the network disruption). The download manager 146 may use any suitable technique, logic, or protocol for creating download tasks to download the second personalized data 104, such as cURL, hypertext transfer protocol (HTTP), etc.

If, at sub-block 412, the availability indicates that the second personalized data 104 is unavailable, the process 400 may follow the "NO" route from sub-block 412 to sub-block 418, where the artifact manager 142 may wait for a trigger to cause it to send subsequent request data by iterating from sub-block 406 to at least sub-block 412. Alternatively, the process 400 may arrive at sub-block 418 after the second personalized data 104 is downloaded at sub-block 416, where the artifact manager 142 may wait for the trigger to cause it to send subsequent request data by iterating from sub-block 406 to at least sub-block 412.

The trigger at block 418 can be time based, such that a predefined period of time can be defined for an interval between sending sequential request data at sub-block 406. For instance, the next request data sent at sub-block 406 may be sent after a predefined period of time since previous request data was sent to the remote system 114 for requesting compiled personalized data 104. The interval between sequential requests can be configurable. In some embodiments, new request data is sent to the remote system 114 every 5 minutes, every 10 minutes, every 15 minutes, or the like. This is suitable for personalized data that may be updated relatively frequently.

The trigger at block 418 can be event based, such that the occurrence of an event causes the artifact manager 142 to send subsequent request data at sub-block 406. An example event that may trigger new request data to be sent at sub-block 406 is user input received by the speech interface device to change a language setting from a first language (e.g., English) to a second language (e.g., Spanish). In this scenario, the request data sent at sub-block 406 in response to the language setting change may request personalized data 104 that is usable by the local speech processing component 136 to understand a spoken form of a word(s) or phrase(s) in the second language (e.g., Spanish). In other words, the artifact manager 142 may maintain personalized data 104 for a currently used language among multiple possible languages in order to conserve memory resources on the speech interface device 102, and, in response to the user 106 changing the language settings from a first language to a second language, the artifact manager 142 may check for updated personalized data 104 for the second language, which is now the currently used language. In this scenario, the personalized data 104 specific to the first language can be maintained on the speech interface device 102 to allow for quickly responding to either language, or the personalized data 104 specific to the first language may be deleted from local memory to conserve memory resources of the speech interface device 102. Other events may trigger a new request as well, such as power cycling (e.g., rebooting, restarting, etc.) the speech interface device 102, a specific user request to check for updates to personalized data 104, etc.

Thus, sub-blocks 406-418 represent a "pull" scheme for receiving personalized data updates from a remote system 114. A "push" scheme is also shown in sub-blocks 420 through 426. At 420, a voice services component 124 of the speech interface device 102 may receive remote directive data (e.g., a data available directive 152) from the remote system 114 (via the personalized data notification system 150) indicating that second personalized data 104 is available. In some embodiments, the remote directive data received at block 420 may be received using Amazon Simple Notification Service (SNS), or any similar messaging service or protocol.

At sub-block 422, based on the remote directive data received at block 420 via the voice services component 124, the download manager 146 of the artifact manager 142 may create a download task to receive the second personalized data 104.

At sub-block 424, the second personalized data 104 may be downloaded based at least in part on the download task created at sub-block 422. As shown by sub-block 426, the artifact manager 142 may send request data to the remote system 114 to download the second personalized data 104, the request data including an identifier of the user account (user ID), a device identifier (device ID) of the speech interface device 102, and/or authentication data. The user ID and/or device ID may be used to identify the user account so that personalized data 104 corresponding to that user account can be identified. The authentication data can include a token or a key used for authenticating the user account and/or the speech interface device 102 before receiving the second personalized data 104.

At 428, the artifact manager 142 may store the second personalized data 104 in memory of the speech interface device 102 at a storage location that is accessible to the local speech processing component 136. In some embodiments, the storage location in the local memory where the second personalized data 104 is stored corresponds to a file system of the speech interface device 102. Similar to the first personalized data 104, the second personalized data 104 stored at block 428 may be received and stored in compiled form and may represent one or more personalized artifacts (e.g., a personalized ASR model, a personalized NLU model, personalized lexical data, etc.) associated with a user account of a user 106 of the speech interface device 102. In some embodiments, the second personalized data 104 includes one or more personalized FSTs (e.g., an ASR FST, a NLU FST, etc.) that are usable, by the local speech processing component 136, to process user speech that includes a personal word(s) or phrase(s), particularly personal word(s) or phrase(s) that are not understandable to the local speech processing component 136 if it were to rely on previous versions of personalized data, such as the first personalized data 104. In other words, the second personalized data 104 may be usable by the local speech processing component 136 to generate the first directive data as a result of processing the first audio data that represents the spoken form of the first word or phrase, and also to generate second directive data as a result of processing second audio data that represents a spoken form of a second word or phrase that is associated with the user account.

At 430, the notification subcomponent 149 of the artifact manager 142 may send notification data to the local speech processing component 136 indicating an availability of the second personalized data 104 for local speech processing. This notification data sent at block 430 may specify the storage location where the second personalized data 104 can be accessed. If the second personalization data 104 is specific to a subcomponent of the local speech processing component 136 (e.g., a personalized ASR model, a personalized NLU model, etc.), the notification data may be sent to that specific subcomponent (e.g. to the ASR subcomponent 138, to the NLU subcomponent 140, etc.) of the local speech processing component 136.

Figure 5:
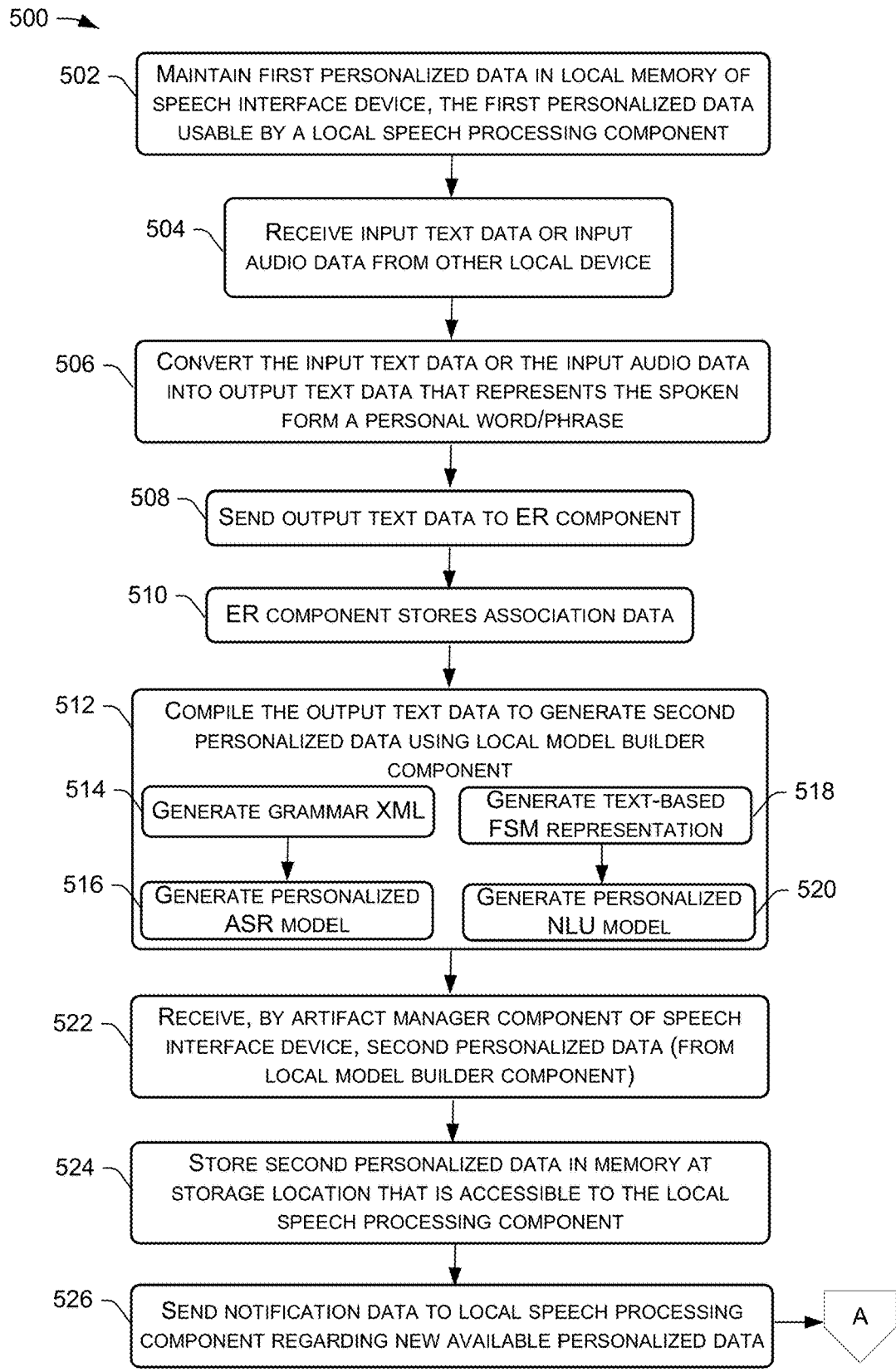
FIG. 5 is a flow diagram of an example process for updating personalized data on a speech interface device when the personalized data is received from another local device in the environment of the speech interface device.

FIG. 5 is a flow diagram of an example process 500 for updating personalized data 104 on a speech interface device 102 when the personalized data is received from another local device in the environment of the speech interface device 102. For discussion purposes, the process 500 is described with reference to the previous figures.

At 502, an artifact manager 142 of a speech interface device 102 may maintain, in memory of the speech interface device 102, first personalized data 104 that is usable by a speech processing component 136 of the speech interface device 102 to understand a spoken form of a first word or phrase in user speech that is associated with a user account associated with the speech interface device 102. The first word or phrase may be associated with the user account by virtue of having been received as input text data from a device associated with the user 106, such as from the user device 148. The first personalized data 104 may be maintained in compiled form and may represent one or more personalized artifacts (e.g., a personalized ASR model, a personalized NLU model, personalized lexical data, etc.) associated with a user account of a user 106 of the speech interface device 102. In some embodiments, the first personalized data 104 includes one or more personalized FSTs (e.g., an ASR FST, a NLU FST, etc.) that are usable, by the local speech processing component 136, to process user speech that includes a personal word(s) or phrase(s). The storage location in the memory where the first personalized data 104 is maintained may correspond to a file system of the speech interface device 102.

At 504, a local data updater 158 of the speech interface device 102 may receive, from a device that is collocated in an environment with the speech interface device 102, input text data or input audio data that represents a second word or phrase that is associated with the user account associated with the speech interface device 102. For instance, input text data may be received, wirelessly or over a wired connection, from a user device 148 in the environment, the input text data relating to new a new personal word(s) or phrase(s) (e.g., a user-created name of an entity). An example of input audio data received at block 504 may be audio data corresponding to an utterance of the user 106 speaking the expression "When I say Entity Name A, I mean the lamp on my nightstand." This may allow a convenient, hands-free manner of setting up personal device names or personal expressions of intent that may be used to generate personalized data 104 usable by the local speech processing component 136. This manner of interacting with the speech interface device 102 using audible commands may be used in the case where the remote system 114 is the authoritative source of the personalized data 104. That is, the user 106 can issue voice commands to setup personalized names of entities, personalized expressions of intent, which are uploaded to the remote system 114.

At 506, the local data updater 158 (via the tokenizer 162) may convert the input text data or the input audio data into output text data that represents the spoken form of second word or phrase. For example, the input text data "Dr. Adams" can be converted into "Doctor Adams." As another example, input audio data captured by a microphone 108 of the speech interface device 102 may be converted into the output text data using the ASR component 138, which performs ASR processing on the input audio data to generate the output text data.

At 508, the local updater 158 may send the output text data to the ER subcomponent 166 of the local speech processing component 136. At 510, the ER subcomponent 166 may store association data 168 that associates the output text data with an identifier of an entity. For example, the association data 168 may be in the form of a database that keeps track of personalized entities (a mapping of entities to canonical identifiers of those entities), as well as synonyms. In an illustrative example, the output text data may relate to the band "Guns N' Roses", for which there may be synonyms, such as "G-N-R". The ER subcomponent 166 may maintain the association data 168 that maps this output text to a canonical value (e.g., "Artist XF422," which may correspond to Guns N' Roses) so that a slot value can be translated to the canonical value during speech processing, and the canonical value can be provided to a skill (e.g., an application 126) to play the correct media file.

At 512, a local model builder 164 of the speech interface device 102 may compile the output text data to generate second personalized data 104 in compiled form. As shown by sub-blocks 514 and 516, the compiling operation at block 512 may include generating, at sub-block 514, a grammar Extensible Markup Language (XML) file for a domain, among multiple domains, based at least in part on the output text data, and, generating, at sub-block 516, a personalized ASR model based on the grammar XML file. The operations at sub-blocks 514 and 516 may be performed by the ASR model builder 170 to generate the second personalized data 104 as a personalized ASR model, which may be a personalized ASR FST, in some embodiments. For example, ASR personalization may define a set of grammars that can be recognized. The ASR model builder 170 may accept output text data relating to a set of entities (e.g., in JavaScript Object Notation (JSON) format), and may constructs a grammar XML file for each individual domain. These grammar XML files may then be defined in a "listFile," with an output filename. Each grammar XML file may generate one personalized ASR FST.

Additionally, or alternatively, as shown by sub-blocks 518 and 520, the compiling operation at block 512 may include generating, at sub-block 518, a text-based Finite State Machine (FSM) representation based at least in part on the output text data, and, generating, at sub-block 520, a personalized NLU model based on the text-based FSM representation. The operations at sub-blocks 518 and 520 may be performed by the NLU model builder 172 to generate the second personalized data 104 as a personalized NLU model, which may be a personalized NLU FST, in some embodiments. For example, NLU personalization may add a set of slots that can be resolved. The NLU model builder 172 may accept output text data relating to a set of entities, and constructs a text based FSM representation. These text FSMs may encode the cost of transitioning from one state to another. Each text FSM may be compiled into one personalized NLU FST. A "config" file may be generated to capture the group or domain of each personalized NLU FST in this scenario. In some embodiments, a personalized ASR FST may be combined with a personalized NLU FST into a single FST.

The order of blocks 508-512, as shown in FIG. 5, is not intended to be construed as a limitation. For example, blocks 508-512 can be combined in any order and/or performed in parallel to implement the process 500. In particular, block 508 and block 512 may be performed in parallel, in some implementations. In other words, the output text data can be compiled by the local model builder 164 and sent to the ER subcomponent 166 in parallel, in some implementations.

At 522, the artifact manager 142 of the speech interface device 102 may receive second personalized data 104—that is not currently stored in the memory of the speech interface device 102—from the local model builder 164. The second personalized data 104 received at block 522 is compiled data (compiled by the local model builder 164) that is usable by the local speech processing component 136 to understand a spoken form of the first word or phrase (included in the first personalized data 104) and a spoken form of a second word or phrase that is associated with the user account (not included in the first personalized data). Thus, the second personalized data 104 represents updated personalized data 104 that can be used to understand one or more words or phrases that may not be understandable to the local speech processing component 136 if it were to rely on the first personalized data 104 to process user speech that includes the second word or phrase.

At 524, the artifact manager 142 may store the second personalized data 104 in memory of the speech interface device 102 at a storage location that is accessible to the local speech processing component 136. In some embodiments, the storage location in the local memory where the second personalized data 104 is stored corresponds to a file system of the speech interface device 102. Similar to the first personalized data 104, the second personalized data 104 stored at block 428 may be received and stored in compiled form and may represent one or more personalized artifacts (e.g., a personalized ASR model, a personalized NLU model, personalized lexical data, etc.) associated with a user account of a user 106 of the speech interface device 102. In some embodiments, the second personalized data 104 includes one or more personalized FSTs (e.g., an ASR FST, a NLU FST, etc.) that are usable, by the local speech processing component 136, to process user speech that includes a personal word(s) or phrase(s), particularly personal word(s) or phrase(s) that are not understandable to the local speech processing component 136 if it were to rely on previous versions of personalized data, such as the first personalized data 104.

At 526, the notification subcomponent 149 of the artifact manager 142 may send notification data to the local speech processing component 136 indicating an availability of the second personalized data 104 for local speech processing. This notification data sent at block 430 may specify the storage location where the second personalized data 104 can be accessed. If the second personalization data 104 is specific to a subcomponent of the local speech processing component 136 (e.g., a personalized ASR model, a personalized NLU model, etc.), the notification data may be sent to that specific subcomponent (e.g. to the ASR subcomponent 138, to the NLU subcomponent 140, etc.) of the local speech processing component 136.

Figure 6:
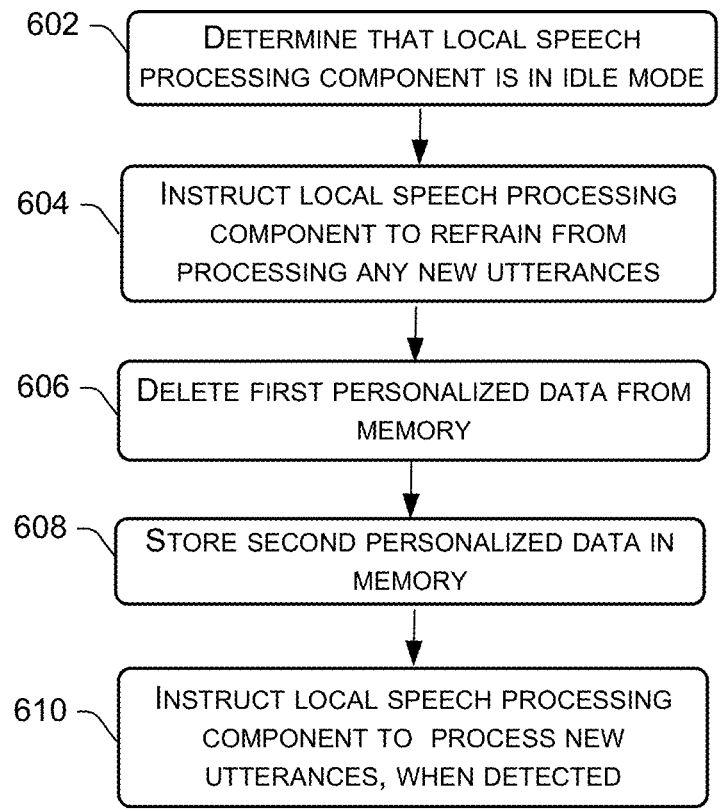
FIG. 6 is a flow diagram of an example process for storing new personalized data in, and deleting stale personalized data from, local memory of a speech interface device.

FIG. 6 is a flow diagram of an example process 600 for storing new personalized data in, and deleting stale personalized data from, local memory of a speech interface device 102. For discussion purposes, the process 600 is described with reference to the previous figures. Furthermore, the process 600 may represent a sub-process of block 428 or block 524 of FIG. 4 or 5, respectively.

At 602, at a time when new personalized data 104 is ready to be stored in memory of a speech interface device 102 to update the personalized data 104 on the speech interface device, the artifact manager 142 of the speech interface device 102 may determine whether the local speech processing component 136 is in an idle mode of operation (e.g., not actively processing user speech). If the local speech processing component 136 is not in idle mode, the artifact manager 142 may wait until it is in idle mode at block 602.

At 604, the artifact manager 142 may send a first instruction to the local speech processing component 136 instructing the local speech processing component 136 to refrain from processing any new utterances representing the user speech until a second instruction is issued.

At 606, the artifact manager 142 may delete, from the memory, a previous version of personalized data 104 (e.g., the first personalized data 104 referenced with respect to FIGS. 4 and 5) while the local speech processing component 136 is in the idle mode.

At 608, the artifact manager 142 may store the ready-to-be-stored personalized data 104 (e.g., the second personalized data 104 referenced with respect to FIGS. 4 and 5) in memory of the speech interface device 102 while the local speech processing component 136 is in the idle mode and after deleting the previous version of personalized data 104 (e.g., the first personalized data 104) from the memory at block 606.

At 610, the artifact manager 142 may send the second instruction to the local speech processing component 136, the second instruction giving the local speech processing component 136 permission to process the new utterances representing the user speech. The process 600 is a technique for updating personalized data 104 on the speech interface device 102 in a way that conserves memory resources of the speech interface device 102 because a stale version of personalized data 104 is deleted prior to storing a new/current version of personalized data 104 on the speech interface device 102.

Figure 7:
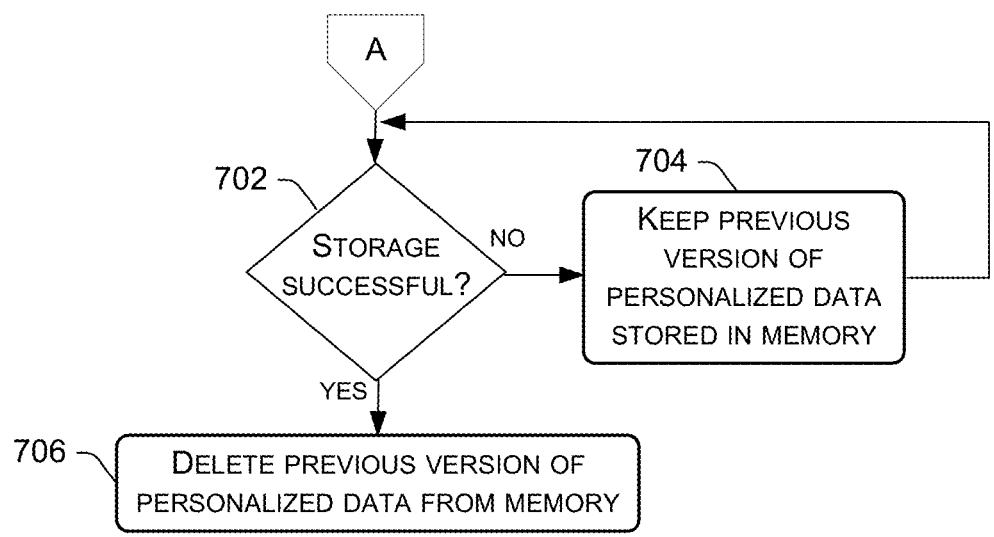
FIG. 7 is a flow diagram of an example process for deleting stale personalized data from local memory of a speech interface device upon confirmation of successfully storing new personalized data.

FIG. 7 is a flow diagram of an example process 700 for deleting stale personalized data from local memory of a speech interface device 102 upon confirmation of successfully storing new personalized data. For discussion purposes, the process 700 is described with reference to the previous figures. As shown by the off-page reference "A" in FIGS. 4, 5, and 7, the process 700 may continue from block 430 of the process 400 or block 526 of the process 500.

At 702, the artifact manager 142, after initiating a write operation to store updated personalized data 104 (e.g., the second personalized data 104 referenced with respect to FIGS. 4 and 5) in memory of the speech interface device 102, may determine whether the second personalized data 104 has been successfully stored in the memory. If the second personalized data 104 has not been successfully stored in the memory, the process 700 may follow the "NO" route from block 702 to block 704.

At 704, the artifact manager 142 may keep a previous/existing version of the personalized data (e.g., the first personalized data 104 referenced with respect to FIGS. 4 and 5) stored in the memory of the speech interface device 102, such as by refraining from deleting the first personalized data. The process 700 may iterate the determination operation at block 702 to continue to monitor the success (or lack thereof) of the write operation to store the second personalized data 104 in memory of the speech interface device 102. In some embodiments, a timeout period may be utilized to abort the write operation if successful storage of the second personalized data 104 is not attained. However, assuming that the second personalized data 104 is eventually stored successfully, this determination can be made at block 702, causing the process 700 to follow the "YES" route from block 702 to block 706 where the artifact manager 142 may delete, from the memory of the speech interface device 102, the first personalized data 104 (i.e., the previous/existing version of the personalized data) based at least in part on determining that the second personalized data 104 has been successfully stored in the memory. The process 700 is a technique for updating personalized data 104 on the speech interface device 102 in a way that reduces latency when updating personalized data 104 on the speech interface device 102 because the local speech processing component 136 may continue to process user speech using the first personalized data 104 until the second personalized data 104 is successfully stored on the speech interface device 102.

In some embodiments, the artifact manager 142 may evaluate different criteria at block 702 (alternatively or in addition to the successful storage determination) in order to determine whether the previous/existing version of the personalized data is to be deleted from the memory of the speech interface device 102. For instance, the artifact manager 142 may determine, at 702, if a user request to delete the previous/existing version of the personalized data has been received, and, if so, the process 700 may follow the "YES" route from block 702 to block 706 for deletion of the previous version. As another example, the artifact manager 142 may determine, at 702, if other content having a higher priority has been received, or is otherwise accessible from local memory of the speech interface device 102, and, if so, the process 700 may follow the "YES" route from block 702 to block 706 for deletion of the previous version.

Figure 8:
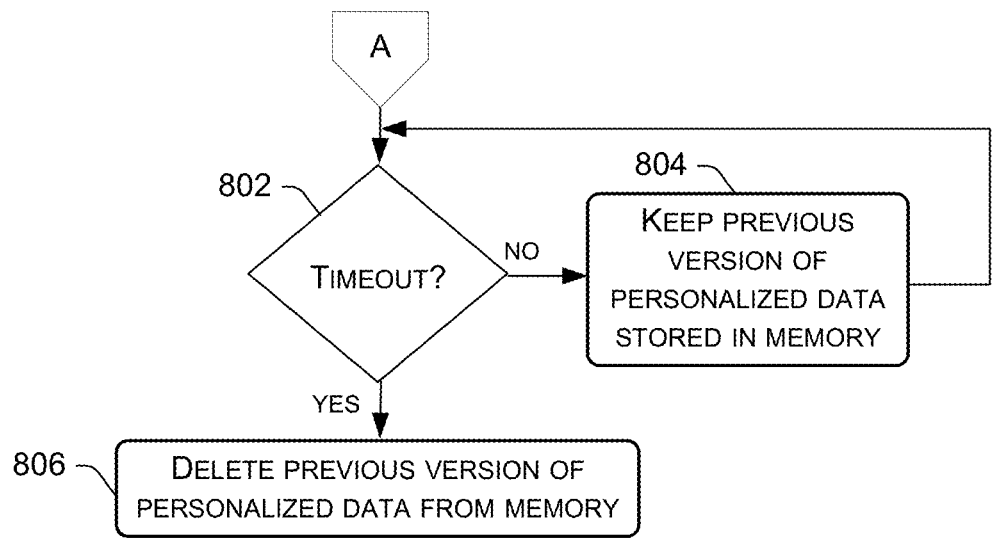
FIG. 8 is a flow diagram of an example process for deleting stale personalized data from local memory of a speech interface device.

FIG. 8 is a flow diagram of an example process 800 for deleting stale personalized data from local memory of a speech interface device 102. For discussion purposes, the process 800 is described with reference to the previous figures. As shown by the off-page reference "A" in FIGS. 4, 5, and 8, the process 800 may continue from block 430 of the process 400 or block 526 of the process 500.

At 802, the artifact manager 142, after storing updated personalized data 104 (e.g., the second personalized data 104 referenced with respect to FIGS. 4 and 5) in memory of the speech interface device 102, may determine whether a predefined amount of time has lapsed since storing the second personalized data 104 in the memory. If the predefined amount of time has not lapsed since storing the second personalized data 104 in the memory, the process 800 may follow the "NO" route from block 802 to block 804.

At 804, the artifact manager 142 may keep a previous/existing version of the personalized data (e.g., the first personalized data 104 referenced with respect to FIGS. 4 and 5) stored in the memory of the speech interface device 102, such as by refraining from deleting the first personalized data. The process 800 may iterate the determination operation at block 802 to continue to monitor the timeout period until eventually the predefined amount of time lapses, causing the process 800 to follow the "YES" route from block 802 to block 806 where the artifact manager 142 may delete, from the memory of the speech interface device 102, the first personalized data 104 (i.e., the previous/existing version of the personalized data) based at least in part on determining that the predefined amount of time has lapsed since storing the second personalized data 104 in the memory. The process 800 is a technique for updating personalized data 104 on the speech interface device 102 in a way that reduces latency when updating personalized data 104 on the speech interface device 102 because the local speech processing component 136 may continue to process user speech using the first personalized data 104 until a period of time after the second personalized data 104 is stored on the speech interface device 102. The predefined amount of time may be set at a value to support backwards compatibility to previous versions of personalized data 104, and/or to provide an ability to quickly switch between different languages, if a user 106 frequently switches between speaking different languages. After a period of time where one language is not used at all, the personalized data 104 for that language may be deleted from the memory of the speech interface device 102.

Figure 9:
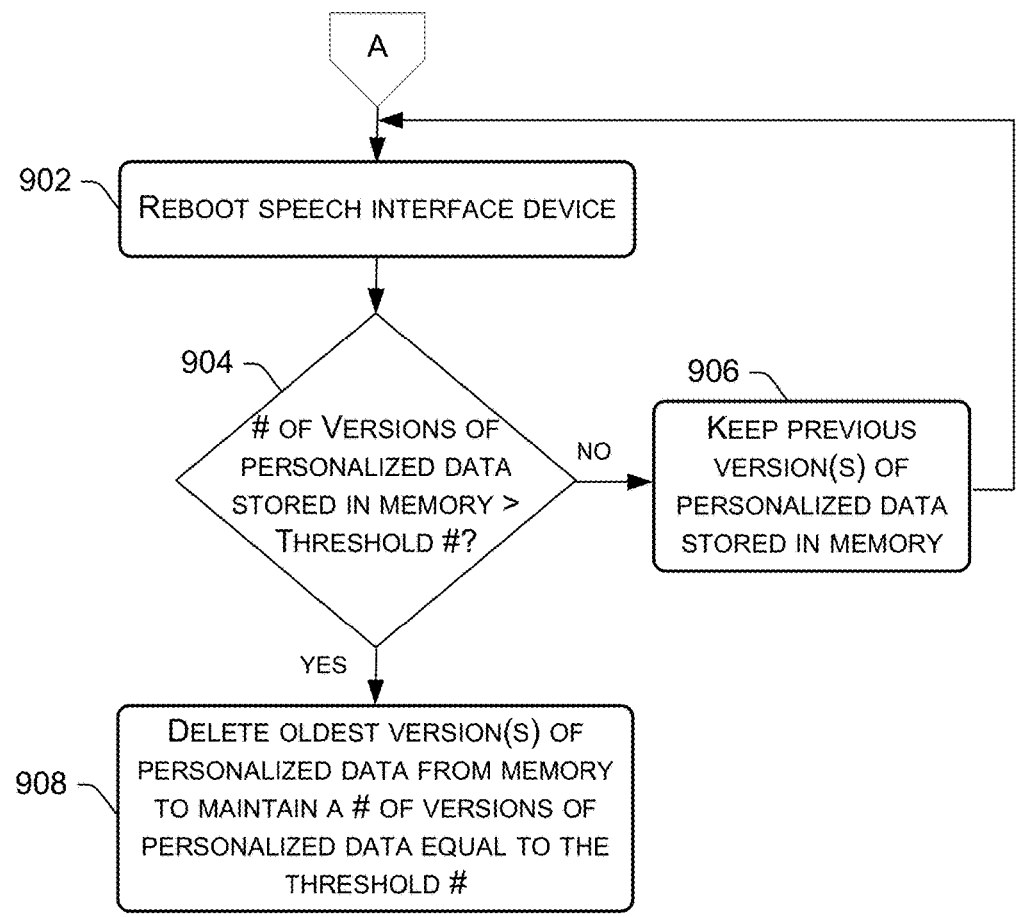
FIG. 9 is a flow diagram of an example process for deleting stale personalized data from local memory of a speech interface device.

FIG. 9 is a flow diagram of an example process 900 for deleting stale personalized data from local memory of a speech interface device. For discussion purposes, the process 900 is described with reference to the previous figures. As shown by the off-page reference "A" in FIGS. 4, 5, and 9, the process 900 may continue from block 430 of the process 400 or block 526 of the process 500.

At 902, the speech interface device 102 may reboot, restart, or otherwise power cycle. This may occur in response to a user unplugging the speech interface device 102 from power, and subsequently plugging the speech interface device 102 back into a power outlet. In some cases, a reboot may occur in response to another event, such as periodically, after receiving a software update, etc.

At 904, the artifact manager 142, may determine whether a number of versions (e.g., previous and current versions) of personalized data stored in the memory of the speech interface device 102 exceeds a threshold number. The threshold number is configurable. For example, the operation at block 904 may determine whether there are more than two versions of personalized data 104 stored in the memory of the speech interface device 102. If the number of versions of personalized data stored in the memory of the speech interface device 102 does not exceed the threshold number, the process 900 may follow the "NO" route from block 904 to block 906. Using a threshold of two versions as an example, if there is no more than a current version of personalized data and one previous version of the personalized data in the memory of the speech interface device 102, this example threshold is not exceeded, and the process 900 may follow the "NO" route from block 904 to block 906.

At 906, the artifact manager 142 may keep the version of the personalized data stored in the memory of the speech interface device 102, such as by refraining from deleting any personalized data. The process 900 may iterate until another reboot occurs at block 902.

If, at block 904, the number of versions of personalized data stored in the memory of the speech interface device 102 exceeds the threshold number, the process 900 may follow the "YES" route from block 904 to block 908. Again, using a threshold of two versions as an example, if the memory currently maintains a current version of personalized data, a first previous version of the personalized data, and a second previous version of the personalized data that is older than the first previous version, this example threshold is exceeded, and the process 900 may follow the "YES" route from block 904 to block 908.

At 908, the artifact manager 142 may delete, from the memory of the speech interface device 102, the oldest version(s) of the personalized data based at least in part on determining that the memory maintains too many versions at block 904. In the running example using a threshold of two versions, the artifact manager 142 may delete the second previous version of the personalized data (which is older than the first previous version), leaving the current version and the first previous version stored in the memory of the speech interface device 102. Thus, the process 900 is a way to "clean up" any old versions of personalized data that can be deleted to free up space in local memory of the speech interface device 102.

Figure 10:
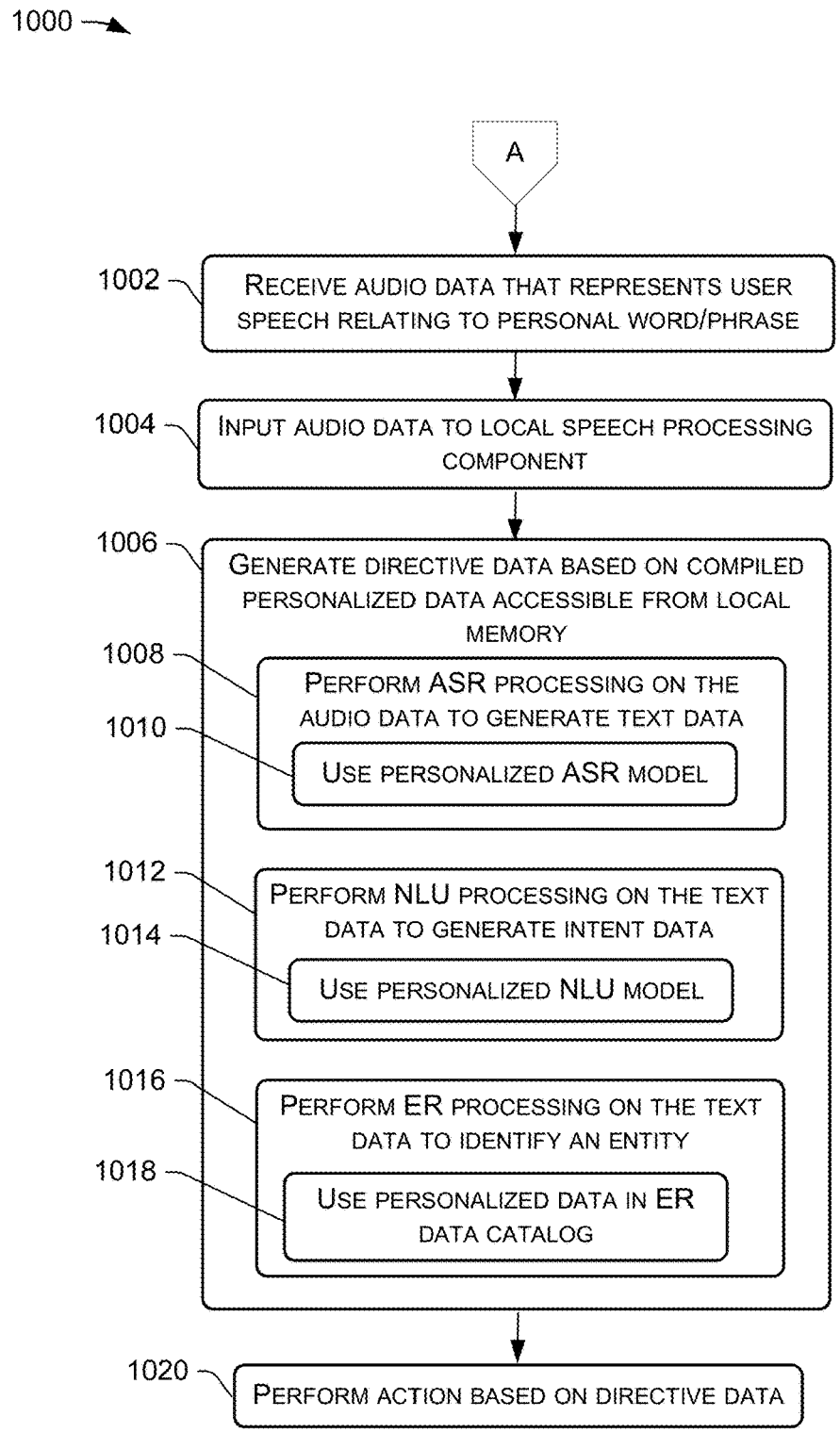
FIG. 10 is a flow diagram of an example process for a speech interface device using locally-available personalized data to respond to user speech.

FIG. 10 is a flow diagram of an example process 1000 for a speech interface device 102 using locally-available personalized data to respond to user speech. For discussion purposes, the process 1000 is described with reference to the previous figures. As shown by the off-page reference "A" in FIGS. 4, 5, and 10, the process 1000 may continue from block 430 of the process 400 or block 526 of the process 500.

At 1002, a voice services component 124 of the speech interface device 102 may receive audio data that represents user speech that includes a word or phrase that is associated with a user account associated with the speech interface device 102.

At 1004, the audio data may be input to the local speech processing component 136 of the speech interface device 102. This may be accomplished by the subcomponents of the hybrid request selector 128. It is to be appreciated that the audio data may also be sent to a remote speech processing system 118, and the hybrid request selector 128 is configured to determine which response data to use for responding to the user speech. In the process 1000, it is presumed that the hybrid request selector 128 determines to respond to the user speech with directive data generated by the local speech processing component 136.

Accordingly, at 1006, the local speech processing component 136 may generate directive data based at least in part on the compiled personalized data 104 that is accessible from the storage location in the memory of the speech interface device.

As shown by the sub-blocks 1008 through 1018, the generation of directive data can include multiple stages of speech processing. At sub-block 1008, the ASR subcomponent 138 of the local speech processing component 136 may perform ASR processing on the audio data to generate ASR text data. If the personalized data 104 available in memory includes a personalized ASR model, the ASR subcomponent 138 may, at sub-block 1010, use the personalized ASR model to generate the ASR text data from the audio data.

At sub-block 1012, the NLU subcomponent 140 of the local speech processing component 136 may perform NLU processing on the ASR text data to generate intent data. If the personalized data 104 available in memory includes a personalized NLU model, the NLU subcomponent 140 may, at sub-block 1014, use the personalized NLU model to generate the intent data from the ASR text data.

At sub-block 1016, the ER subcomponent 166 (or the NLU subcomponent 140 using the ER subcomponent 166) of the local speech processing component 136 may perform ER processing on the ASR text data to identify an entity. If the association data 168 (e.g., an ER data catalog) maintained by the ER subcomponent 166 includes at least some of the available personalization data 104, the ER subcomponent 166 may, at sub-block 1018, use the personalized data 104 available in the ER data catalog to identify the entity from the ASR text data.

At 1020, the speech interface device 102 may perform an action based on the directive data generated at block 1006. The action may comprise outputting content (e.g., an audible TTS response, music, video, etc.) via an output device(s) 110 of the speech interface device 102, and/or sending a command to a second device in the environment via the communications interface 112 of the speech interface device 102, the command instructing an operation to be performed at the second device (e.g., turn on a light).

Figure 11:
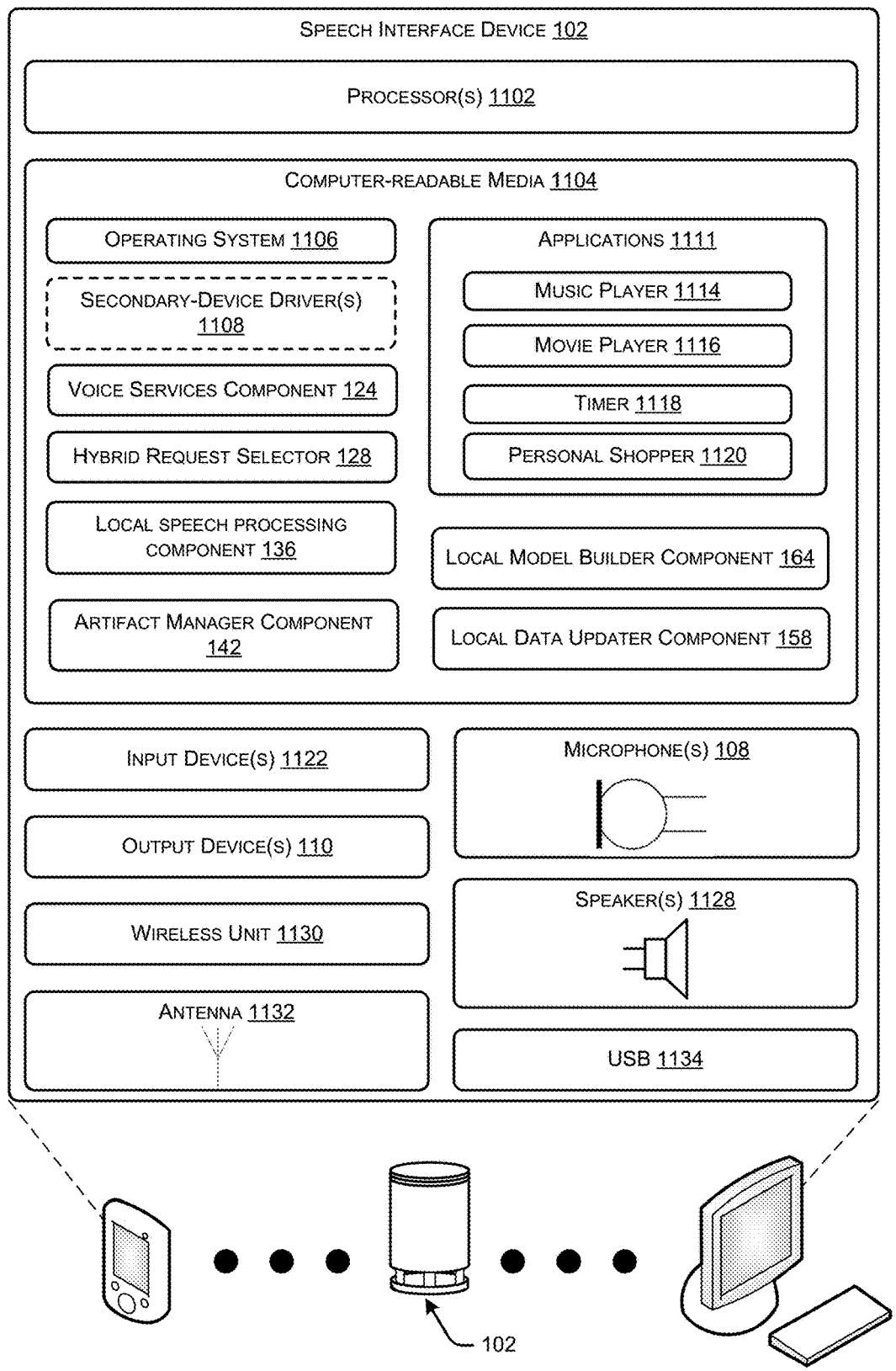
FIG. 11 illustrates example components of an electronic device, such as the hybrid speech interface device of FIG. 1.

FIG. 11 illustrates example components of an electronic device, such as the speech interface device 102 of FIG. 1. The speech interface device 102 may be implemented as a standalone device that is relatively simple in terms of functional capabilities with limited input/output components, memory, and processing capabilities. For instance, the speech interface device 102 does not have a keyboard, keypad, or other form of mechanical input. Nor does it have a display (other than simple lights, for instance) or touch screen to facilitate visual presentation and user touch input. Instead, the speech interface device 102 may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.). Nonetheless, the primary and potentially only mode of user interaction with the speech interface device 102 is through voice input and audible output.

The speech interface device 102 may also be implemented in other form factors, such as a mobile device (e.g., a smart phone or personal digital assistant). The mobile device may include a touch-sensitive display screen and various buttons for providing input as well as additional functionality such as the ability to send and receive telephone calls. Alternative implementations of the speech interface device 102 may also include configuration as a personal computer. The personal computer may include a keyboard, a mouse, a display screen, and any other hardware or functionality that is typically found on a desktop, notebook, netbook, or other personal computing devices. These devices, however, are merely examples and not intended to be limiting, as the techniques described in this disclosure may be used in essentially any device that has an ability to recognize speech input or other types of natural language input.

In the illustrated implementation, the speech interface device 102 includes one or more processors 1102 and computer-readable media 1104 (also referred to herein as the "memory" of the speech interface device 102). In some implementations, the processors(s) 1102 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 1102 may possess its own local memory, which also may store program modules, program data, and/or one or more operating systems.

The computer-readable media 1104 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 1104 may be implemented as computer-readable storage media ("CRSM"), which may be any available physical media accessible by the processor(s) 1102 to execute instructions stored on the memory 1104. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 1102.

Several modules such as instruction, datastores, and so forth may be stored within the computer-readable media 1104 and configured to execute on the processor(s) 1102. A few example functional modules are shown as applications stored in the computer-readable media 1104 and executed on the processor(s) 1102, although the same functionality may alternatively be implemented in hardware, firmware, or as a system on a chip (SOC). At least some of the components shown in FIG. 1 may also be stored in the computer-readable media 1104 and executable by the processor(s) 1102 to implement the functionality described herein. For example, the voice services component 124, the hybrid request selector 128, the local speech processing component 136, the artifact manager 142, the local model builder 164, and/or the local data updater component 158, as well as their subcomponents, may be stored in the computer-readable media 1104 and executable by the processor(s) 1102 to implement the functionality described herein.

An operating system module 1106 may be configured to manage hardware within and coupled to the speech interface device 102 for the benefit of other modules. In addition, in some instances the speech interface device 102 may include some or all of one or more secondary-device drivers 1108. In other instances, meanwhile, the speech interface device 102 may be free from the drivers 1108 for interacting with second devices.

The speech interface device 102 may also include a plurality of applications 1111 stored in the computer-readable media 1104 or otherwise accessible to the speech interface device 102. In this implementation, the applications 1111 are a music player 1114, a movie player 1116, a timer 1118, and a personal shopper 1120. However, the speech interface device 102 may include any number or type of applications and is not limited to the specific examples shown here. The music player 1114 may be configured to play songs or other audio files. The movie player 1116 may be configured to play movies or other audio visual media. The timer 1118 may be configured to provide the functions of a simple timing device and clock. The personal shopper 1120 may be configured to assist a user in purchasing items from web-based merchants. When implementing the "hybrid" functionality described herein where a remote system 114 is unavailable to the speech interface device 102, these applications 1111 may be configured to access local resources (e.g., local music or movie libraries, a local shopping list, a local calendar, etc.). In some cases, changes made to these local resources may be synched with remote versions of those resources when the remote system 114 subsequently becomes available to the speech interface device 102.

Generally, the speech interface device 102 has input devices 1122 and output devices 110. The input devices 1122 may include, without limitation, a keyboard, keypad, mouse, touch screen, joystick, control buttons, etc. In some implementations, one or more microphones 108 may function as input devices 1122 to receive audio input, such as user voice input. The output device(s) 110 may include, without limitation, a display(s), a light element (e.g., LED), a vibrator to create haptic sensations, or the like. In some implementations, one or more speakers 1128 may function as output devices 110 to output audio sounds (e.g., audio content, TTS responses, tones at various frequencies, etc.).

A user 106 may interact with the speech interface device 102 by speaking to it, and the one or more microphone(s) 108 captures the user's speech. The speech interface device 102 can communicate back to the user 106 by emitting audible statements through the speaker 1128. In this manner, the user 106 can interact with the speech interface device 102 solely through speech, without use of a keyboard or display.

The speech interface device 102 may further include a wireless unit 1130 coupled to an antenna 1132 to facilitate a wireless connection to a network. The wireless unit 1130 may implement one or more of various wireless and/or IoT technologies, such as Bluetooth protocol, Bluetooth Low Energy (BLE) protocol, ZigBee protocol, Z-wave protocol, WiFi protocol, and/or any other type of protocol usable to communicate wirelessly between electronic devices in an environment, including those that do and/or do not rely data transmission over the wide area network 116. As such, the speech interface device 102 may be configure to act as a hub that can communicate with second devices in the environment and control the second devices, such as by using protocol stacks, drivers, and adapters to communicate over a suitable communications protocol. A USB port 1134 may further be provided as part of the speech interface device 102 to facilitate a wired connection to a network, or a plug-in network device that communicates with other wireless networks. In addition to the USB port 1134, or as an alternative thereto, other forms of wired connections may be employed, such as a broadband connection, Transmission Control Protocol/Internet Protocol (TCP/IP) protocol connection, etc. The communications interface 112 of FIG. 1 may include some or all of these components, and/or other components to facilitate communication with other devices.

Accordingly, when implemented as the primarily-voice-operated speech interface device 102, there may be no input devices, such as navigation buttons, keypads, joysticks, keyboards, touch screens, and the like other than the microphone(s) 108. Further, there may be no output such as a display for text or graphical output. The speaker(s) 1128 may be the main output device. In one implementation, the speech interface device 102 may include non-input control mechanisms, such as basic volume control button(s) for increasing/decreasing volume, as well as power and reset buttons. There may also be a simple light element (e.g., LED) to indicate a state such as, for example, when power is on.

Accordingly, the speech interface device 102 may be implemented as an aesthetically appealing device with smooth and rounded surfaces, with one or more apertures for passage of sound waves. The speech interface device 102 may merely have a power cord and optionally a wired interface (e.g., broadband, USB, etc.). As a result, the speech interface device 102 may be generally produced at a low cost. Once plugged in, the speech interface device 102 may automatically self-configure, or with slight aid of the user, and be ready to use. In other implementations, other I/O components may be added to this basic model, such as specialty buttons, a keypad, display, and the like.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A first device comprising:
one or more processors; and
memory storing:
a local speech processing component executable by the one or more processors to cause the first device to perform actions in response to user speech, the first device associated with user account data;
first personalized data, the first personalized data comprising at least one of a first personalized automatic speech recognition (ASR) model or a first personalized natural language understanding (NLU) model, the first personalized data being usable by the local speech processing component to generate first directive data as a result of processing first audio data that represents a first spoken utterance including at least one of a first personal word or a first personal phrase, the first directive data representing a first command configured to cause at least one of the first device or a second device to perform a first action;
an artifact manager component executable by the one or more processors to:
receive, from a third device over a network, second personalized data to be stored in the memory, the second personalized data comprising at least one of a second personalized ASR model or a second personalized NLU model, the second personalized data usable by the local speech processing component to generate the first directive data as a result of processing the first audio data and to generate second directive data as a result of processing second audio data that represents a second spoken utterance including at least one of a second personal word or a second personal phrase, the second directive data representing a second command configured to cause the at least one of the first device or the second device to perform a second action; and
store the second personalized data in the memory at a storage location that is accessible to the local speech processing component;
a voice services component executable by the one or more processors to receive the second audio data; and
a hybrid request selector component executable by the one or more processors to input the second audio data to the local speech processing component;
wherein the local speech processing component is further executable by the one or more processors to:
generate the second directive data as a result of processing the second audio data with reference to the second personalized data; and
receive third directive data generated by a remote system absent the second personalized data, the third directive data representing a third command configured to cause the at least one of the first device or the second device to perform a third action that differs from the second action; and
wherein the voice services component is further executable by the one or more processors to cause the first device to perform second action utilizing the second directive data instead of the third directive data based at least in part on:
the second directive data and from the second audio data including the at least one of the second personal word or the second personal phrase; and
the third directive data being generated absent the second personalized data.

2. The first device of claim 1, wherein the artifact manager component is further executable by the one or more processors to:
send request data to the third device for requesting new personalized data, the request data including at least one of an identifier of the user account or a device identifier of the first device;
receive availability data from the third device indicating that the second personalized data is available; and
receive the second personalized data.

3. The first device of claim 1, wherein the voice services component is further executable by the one or more processors to receive an indication from the third device that the second personalized data is available, and wherein the artifact manager component is further executable by the one or more processors to receive the second personalized data based at least in part on the second personalized data being available.

4. The first device of claim 1, wherein the local speech processing component is configured to utilize a subcomponent for at least one of ASR, NLU, or ER, and wherein the second personalized data is usable by the subcomponent of the speech processing component.

5. The first device of claim 1, wherein the second personalized data comprises a finite state transducer (FST).

6. The first device of claim 1, wherein the second personalized data comprises a compressed graph structure associated with at least one of personal words including the first personal word and the second personal word or personal phrases including the first personal phrase and the second personal phrase.

7. A method, comprising:
receiving, by a first device from a second device over a network, first data that is usable by a speech processing component of the first device to recognize, in user speech, at least a word associated with the account data associated with the first device;
storing the first data in memory of the first device at a storage location that is accessible to the speech processing component;
receiving, by the first device, audio data representing first user speech that includes at least the word;
inputting the audio data to the speech processing component;
generating, by the speech processing component and utilizing the first data, first directive data based at least in part on the audio data and the first data, the first directive data representing a first command configured to cause at least one of the first device or a third device to perform a first action;
receiving second directive data from a remote speech processing system, the second directive data representing a second command configured to cause at least one of the first device or the third device to perform a second action that differs from the first action; and
causing the first action to be performed utilizing the first directive data instead of the second directive data based at least in part on:
the first directive data; and
the second directive data being generated without utilizing the first data.

8. The method of claim 7, further comprising:
sending, by the first device, request data to the second device for requesting compiled data, the request data including at least one of an identifier of a user account or a device identifier of the first device; and
receiving, by the first device, availability data from the second device indicating that the first data is available.

9. The method of claim 8, further comprising sending the request data to the second device after a predefined period of time since previous request data was sent to the second device for requesting the compiled data.

10. The method of claim 8, further comprising sending the request data to the second device in response to user input received by the first device to change a language setting from a first language to a second language, and wherein the first data is usable by the speech processing component to generate the first directive data as a result of processing the audio data that represents a spoken utterance in the second language.

11. The method of claim 8, further comprising:
receiving authentication data from the second device prior to the sending of the request data to the second device; and
sending the authentication data to the second device with the request data.

12. The method of claim 7, wherein the first data is usable by a subcomponent of the speech processing component, and wherein the method further comprises using, by the subcomponent of the speech processing component, the first data for at least one of automatic speech recognition (ASR), natural language understanding (NLU), or entity resolution (ER).

13. The method of claim 7, wherein the first data comprises a finite state transducer (FST).

14. The method of claim 7, wherein the first data comprises a compressed graph structure associated with words including the word.

15. A first device comprising:
one or more processors; and
non-transitory computer-readable media storing instructions that, when executed by the one or more processors, cause the one or more processors to perform operations comprising:
receiving, from a second device over a network, first data that is usable by a speech processing component of the first device to recognize, in user speech, at least a word associated with account data associated with the first device from;
storing the first data at a storage location that is accessible to the speech processing component;
receiving audio data representing the user speech;
inputting the audio data to the speech processing component;
generating first directive data from the audio data with reference to the first data stored in the memory at the storage location, the first directive data representing a first command configured to cause at least one of the first device or a third device to perform a first action;
receiving second directive data from a remote speech processing system, the second directive data representing a second command configured to cause at least one of the first device or the third device to perform a second action that differs from the first action; and
causing the first action to be performed utilizing the first directive data instead of the second directive data based at least in part on:
the first directive data; and
the second directive data being generated without utilizing the first data.

16. The first device of claim 15, the operations further comprising:
receiving an indication that the first data is available, and
receiving the first data based at least in part on the first data being available.

17. The first device of claim 16, the operations further comprising:
receiving authentication data from the second device prior to receiving the indication; and
sending the authentication data to the second device as part of a request to receive the first data.

18. The first device of claim 15, the operations further comprising sending, after storing the first data, notification data to the speech processing component indicating an availability of the first data, wherein the notification data specifies the storage location.

19. The first device of claim 15, wherein the speech processing component is configured to utilize a subcomponent for at least one of automatic speech recognition (ASR), natural language understanding (NLU), or entity resolution (ER), and wherein the first data is usable by the subcomponent of the speech processing component.

20. The first device of claim 15, wherein the first data comprises a finite state transducer (FST).

21. The first device of claim 15, wherein the first data comprises a compressed graph structure associated with words including the word.

* * * * *